(12) United States Patent
Musgrave et al.

(10) Patent No.: US 7,440,277 B2
(45) Date of Patent: Oct. 21, 2008

(54) METHOD AND APPARATUS FOR VENTING A CHASSIS

(75) Inventors: Kenneth Musgrave, Austin, TX (US); Huy Nguyen, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 112 days.

(21) Appl. No.: 11/453,181

(22) Filed: Jun. 14, 2006

(65) Prior Publication Data

US 2006/0238974 A1 Oct. 26, 2006

Related U.S. Application Data

(63) Continuation-in-part of application No. 11/110,377, filed on Apr. 20, 2005, now Pat. No. 7,230,827.

(51) Int. Cl.
*H05K 7/20* (2006.01)
*H01L 23/36* (2006.01)

(52) U.S. Cl. ............... 361/695; 361/690; 361/692; 454/184; 312/223.1; 312/223.2; 312/223.3

(58) Field of Classification Search ......... 361/683–697, 361/726, 732, 784, 790, 801, 802, 816, 818; 312/223.2, 107, 111, 257.1, 236; 165/80.2, 165/80.3, 104.32, 104.33, 165, 185, 47; 454/184; 174/50, 50.1, 35 R; D14/100, 102
See application file for complete search history.

(56) References Cited

U.S. PATENT DOCUMENTS

| 5,440,450 | A | | 8/1995 | Lau et al. |
| 5,845,978 | A | | 12/1998 | Jung |
| D415,139 | S | | 10/1999 | Fu |
| 6,075,698 | A | * | 6/2000 | Hogan et al. ............... 361/695 |
| 6,238,181 | B1 | * | 5/2001 | Chen ......................... 415/175 |
| 6,272,007 | B1 | * | 8/2001 | Kitlas et al. ................. 361/683 |
| 6,288,333 | B1 | * | 9/2001 | Liu et al. ..................... 174/563 |
| 6,296,333 | B1 | * | 10/2001 | Lee et al. .................. 312/223.2 |
| 6,373,697 | B1 | * | 4/2002 | Lajara et al. ................ 361/687 |
| 6,542,362 | B2 | * | 4/2003 | Lajara et al. ................ 361/687 |
| 6,919,816 | B2 | * | 7/2005 | Dearborn et al. ....... 340/815.45 |
| 7,035,095 | B2 | | 4/2006 | Frame et al. |
| 7,066,809 | B2 | * | 6/2006 | Yu et al. ..................... 454/184 |
| 7,205,474 | B2 | * | 4/2007 | Ya .............................. 174/50 |
| 7,218,516 | B2 | * | 5/2007 | Yu et al. ..................... 361/695 |
| 7,245,486 | B2 | * | 7/2007 | Kumano et al. ............. 361/687 |
| 2006/0267466 | A1 | * | 11/2006 | Marroquin et al. .......... 312/323 |

* cited by examiner

*Primary Examiner*—Michael V Datskovskiy
(74) *Attorney, Agent, or Firm*—Haynes and Boone, LLP

(57) ABSTRACT

A chassis venting apparatus includes a chassis wall base member comprising a first wall. A chassis vent structure is located on the chassis wall base member. A chassis venting passageway is defined between the chassis vent structure and the first wall of the chassis wall base member. The chassis venting apparatus may be, for example, removeably coupled to a chassis or fabricated as part of the chassis in order to provide obscured venting of the chassis and a handle for lifting the chassis.

20 Claims, 23 Drawing Sheets

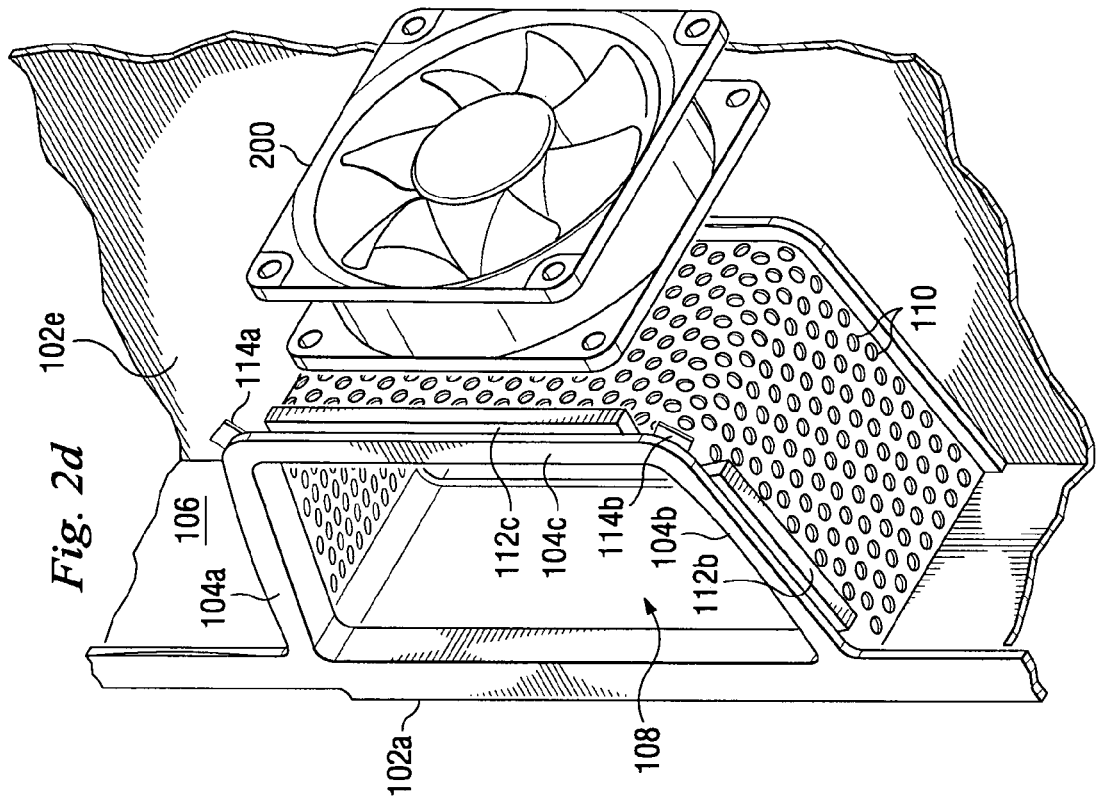
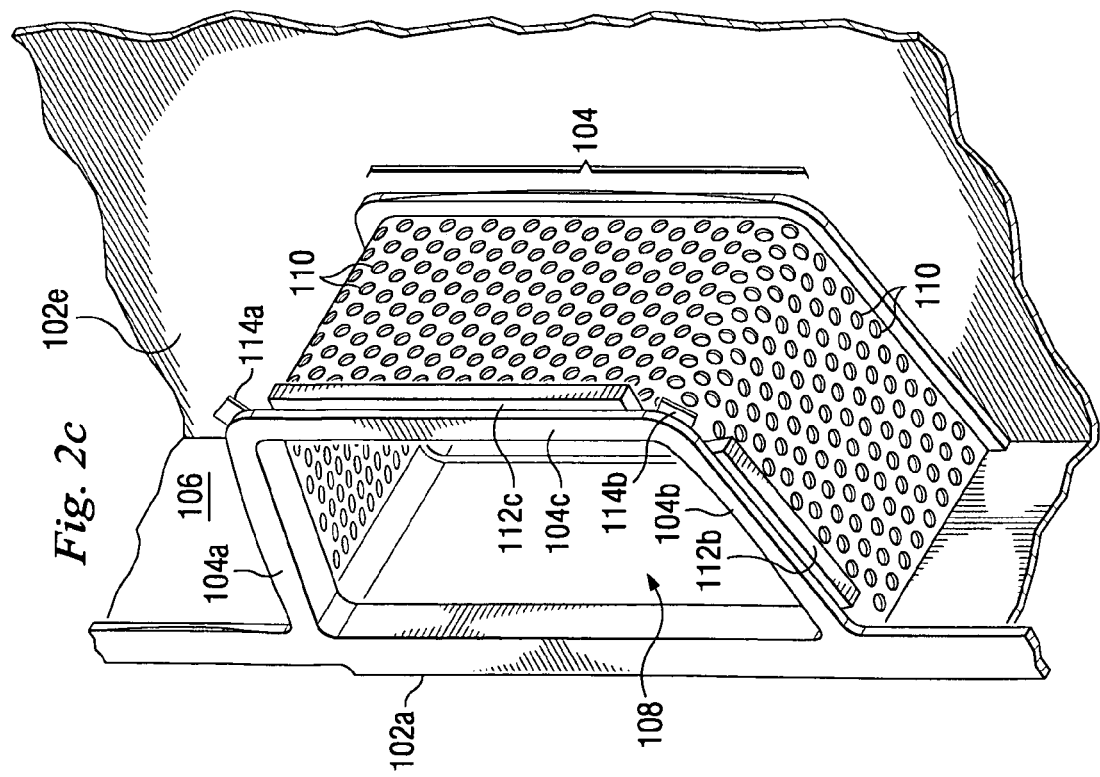

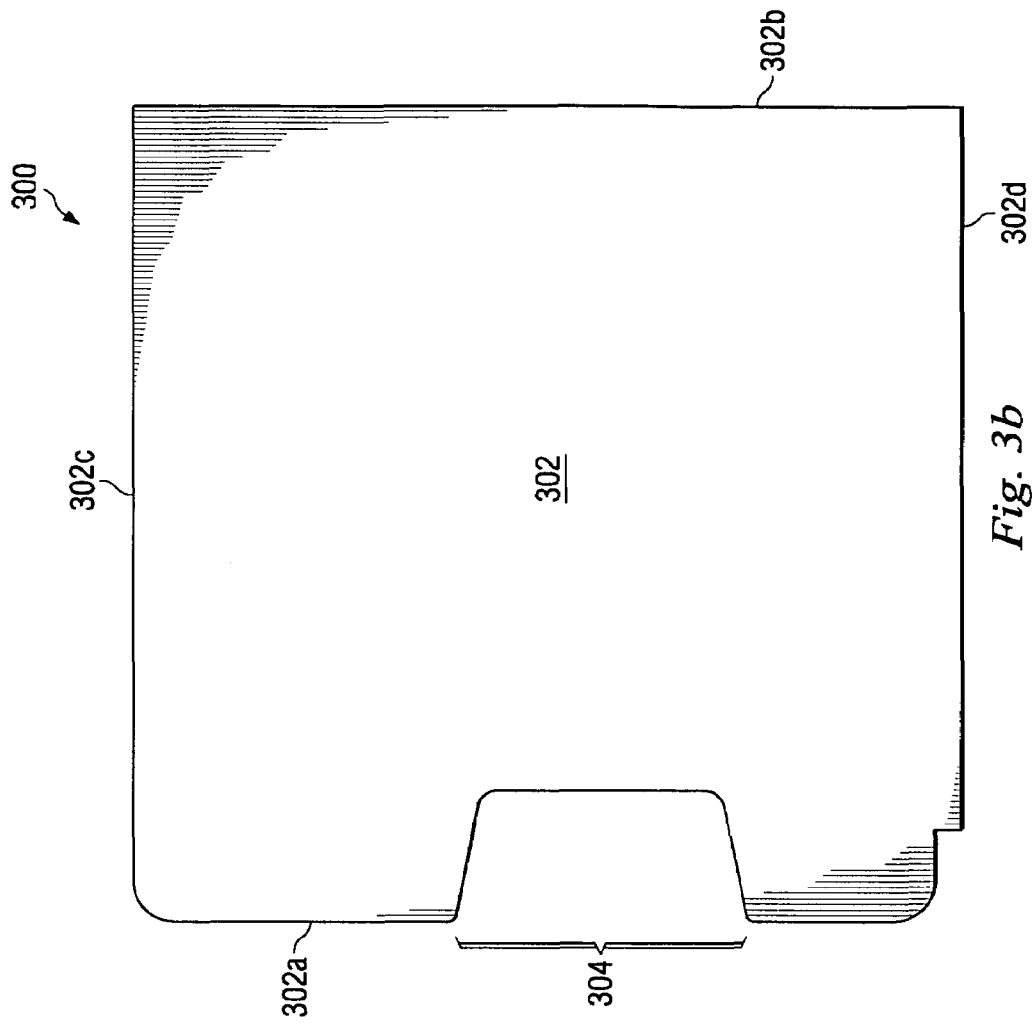
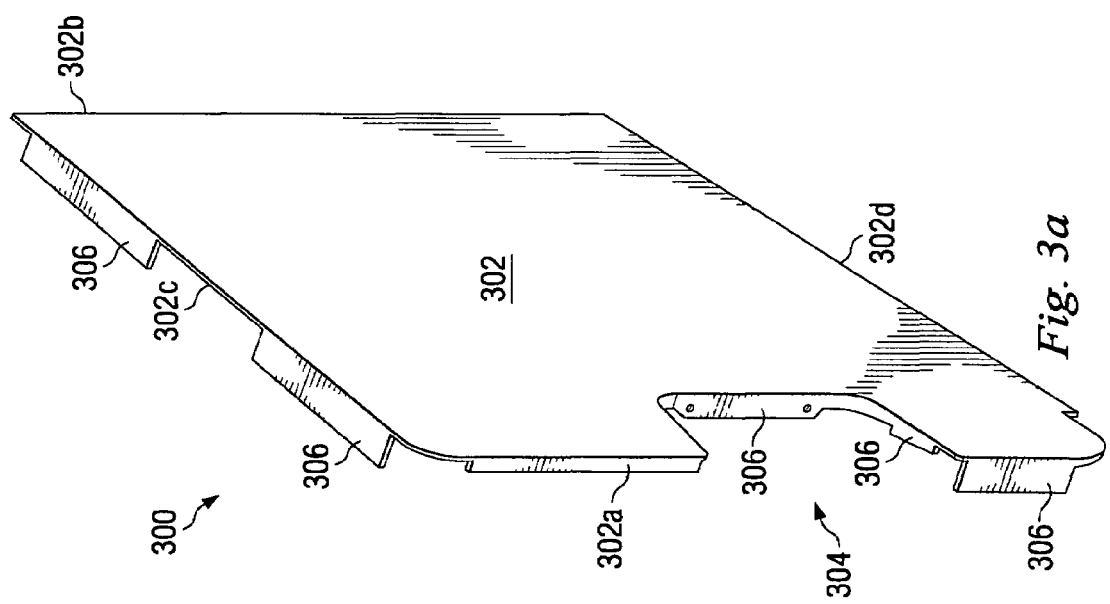

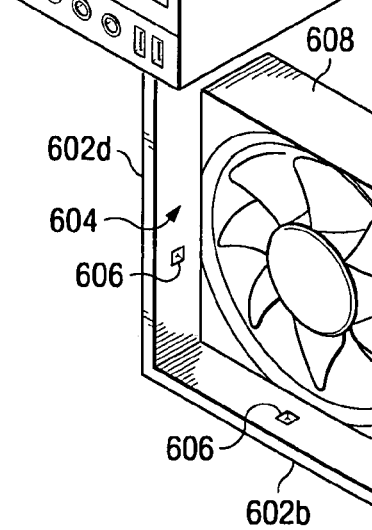

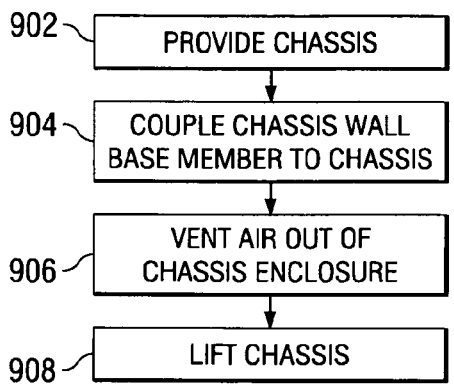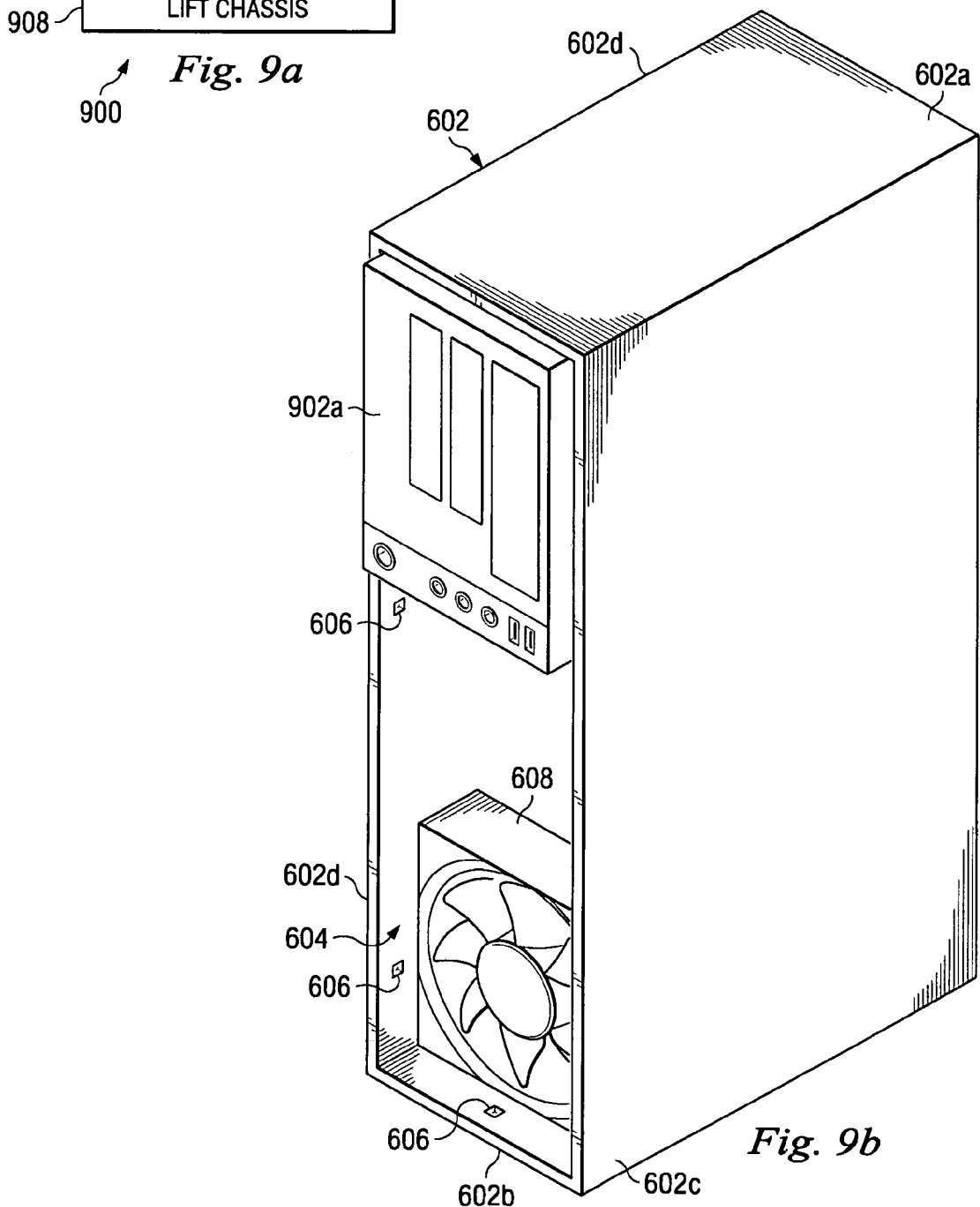

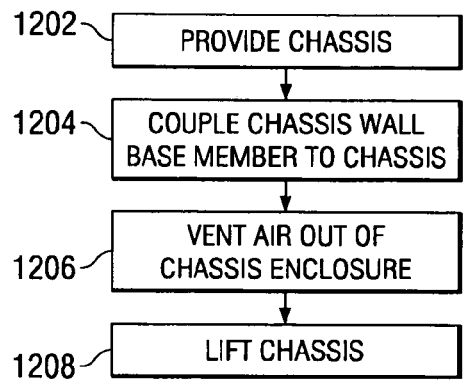
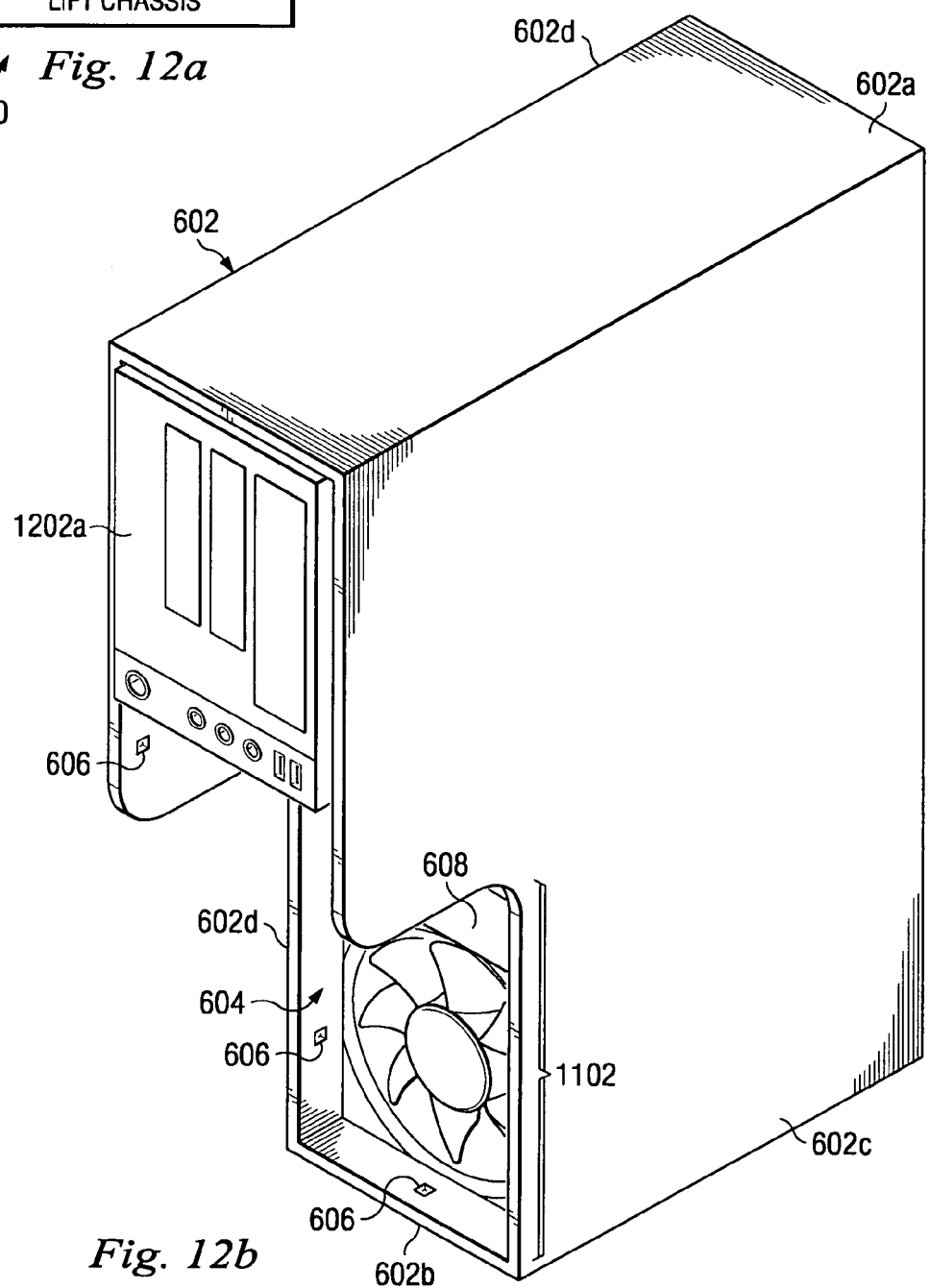

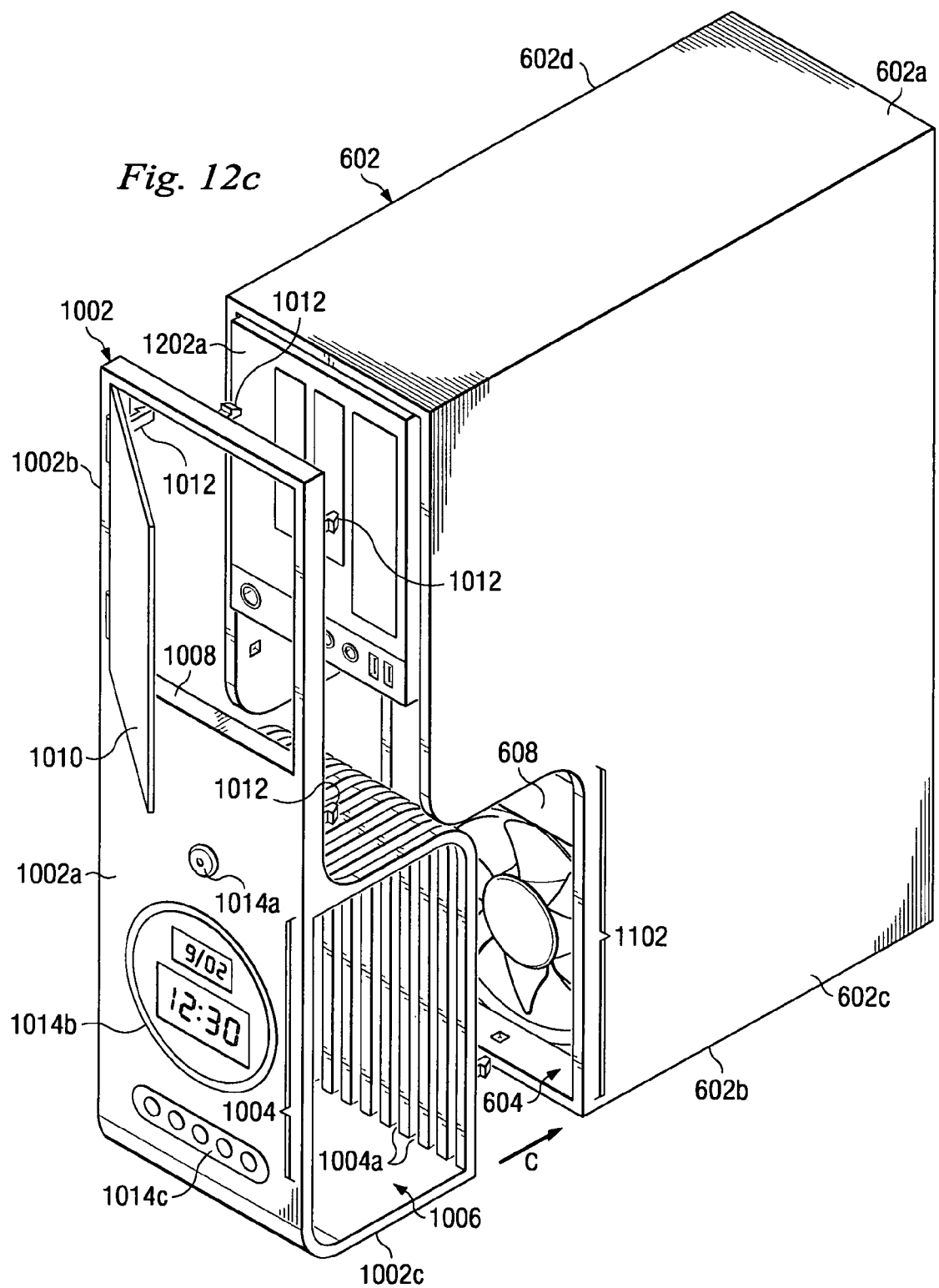

US 7,440,277 B2

METHOD AND APPARATUS FOR VENTING A CHASSIS

CROSS REFERENCE TO RELATED APPLICATIONS

This application is a continuation in part of U.S. Utility patent application Ser. No. 11/110,377, filed on Apr. 20, 2005, the disclosure of which is incorporated herein by reference.

BACKGROUND

The present disclosure relates generally to information handling systems, and more particularly to venting an information handling system chassis.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Increasing power requirements for IHSs continues to drive the need for greater venting area in the IHS chassis in order to satisfy thermal dissipation needs. Challenges exist in balancing the need for thermal dissipation with the concerns arising with respect to aesthetic appeal, structural integrity, and electromagnetic interference. For example, some industry standards, such as the Intel BTX standard, utilize venting on the front of the IHS chassis. Incorporating the necessary venting on the front of the IHS chassis degrades the structural integrity of the chassis, can acoustically impact the chassis negatively, and provides undesirable, direct visual access to the internal components of the IHS. In addition, such added venting must be accomplished without adding size to the system, in order to minimize the cost of shipping the system.

Accordingly, it would be desirable to provide for venting a chassis absent the disadvantages found in the prior methods discussed above.

SUMMARY

According to one embodiment, a chassis venting apparatus is provided that includes a chassis wall base member comprising a first wall, a chassis vent structure located on the chassis wall base member, and a chassis venting passageway defined between the chassis vent structure and the first wall of the chassis wall base member.

BRIEF DESCRIPTION OF THE DRAWINGS

FIG. 2b is a side view illustrating an embodiment of the chassis of FIG. 2a.

FIG. 2c is a perspective view illustrating an embodiment of a chassis vent structure on the chassis of FIG. 2a.

FIG. 2d is a perspective view illustrating an embodiment of a fan mounted in the chassis of FIG. 2a and adjacent the chassis vent structure of FIG. 2c.

FIG. 3a is a perspective view illustrating an embodiment of a chassis cover used with the chassis of FIG. 2a.

FIG. 3b is a side view illustrating an embodiment of the chassis cover of FIG. 3a.

FIG. 4a is a perspective view illustrating an embodiment of the chassis cover of FIG. 3a being coupled to the chassis of FIG. 2a.

FIG. 4b is a perspective view illustrating an embodiment of the chassis cover of FIG. 3a coupled to the chassis of FIG. 2a.

FIG. 5b is a rear perspective view illustrating an embodiment of the chassis venting apparatus of FIG. 5a.

FIG. 7a is a flow chart illustrating an embodiment of a method for venting a chassis.

FIG. 7b is a perspective view illustrating an embodiment of the chassis of FIG. 6 with an IHS component located in the IHS housing.

FIG. 8b is a rear perspective view illustrating an embodiment of the chassis venting apparatus of FIG. 8a.

FIG. 9a is a flow chart illustrating an embodiment of a method for venting a chassis.

FIG. 9b is a perspective view illustrating an embodiment of the chassis of FIG. 6 with an IHS component located in the IHS housing.

FIG. 10b is a rear perspective view illustrating an embodiment of the chassis venting apparatus of FIG. 10a.

FIG. 12a is a flow chart illustrating an embodiment of a method for venting a chassis.

FIG. 12b is a perspective view illustrating an embodiment of the chassis of FIG. 11 with an IHS component located in the IHS housing.

FIG. 12c is a perspective view illustrating an embodiment of the chassis wall base member of FIGS. 10a and 10b being coupled to the chassis of FIG. 12b.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
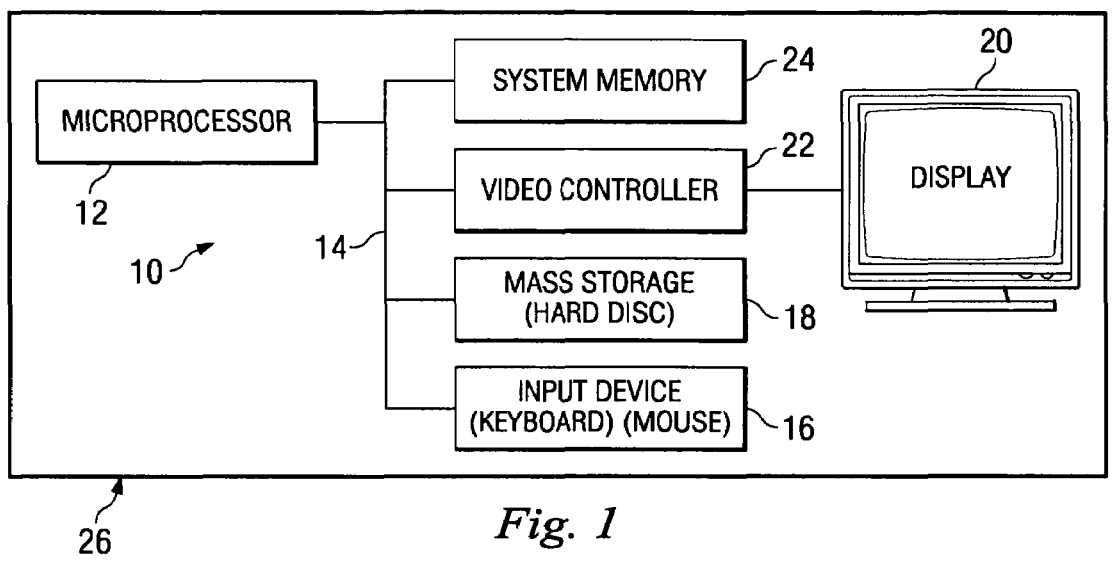
FIG. 1 is a schematic view illustrating an embodiment of an IHS.

In one embodiment, IHS 10, FIG. 1, includes a microprocessor 12, which is connected to a bus 14. Bus 14 serves as a connection between microprocessor 12 and other components of computer system 10. An input device 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with fast storage to facilitate execution of computer programs by microprocessor 12. In an embodiment, a chassis 26 may house some or all of the components of IHS 10. It should be understood that other busses and intermediate circuits can be deployed between the components described above and microprocessor 12 to facilitate interconnection between the components and the microprocessor.

Figure 2B:
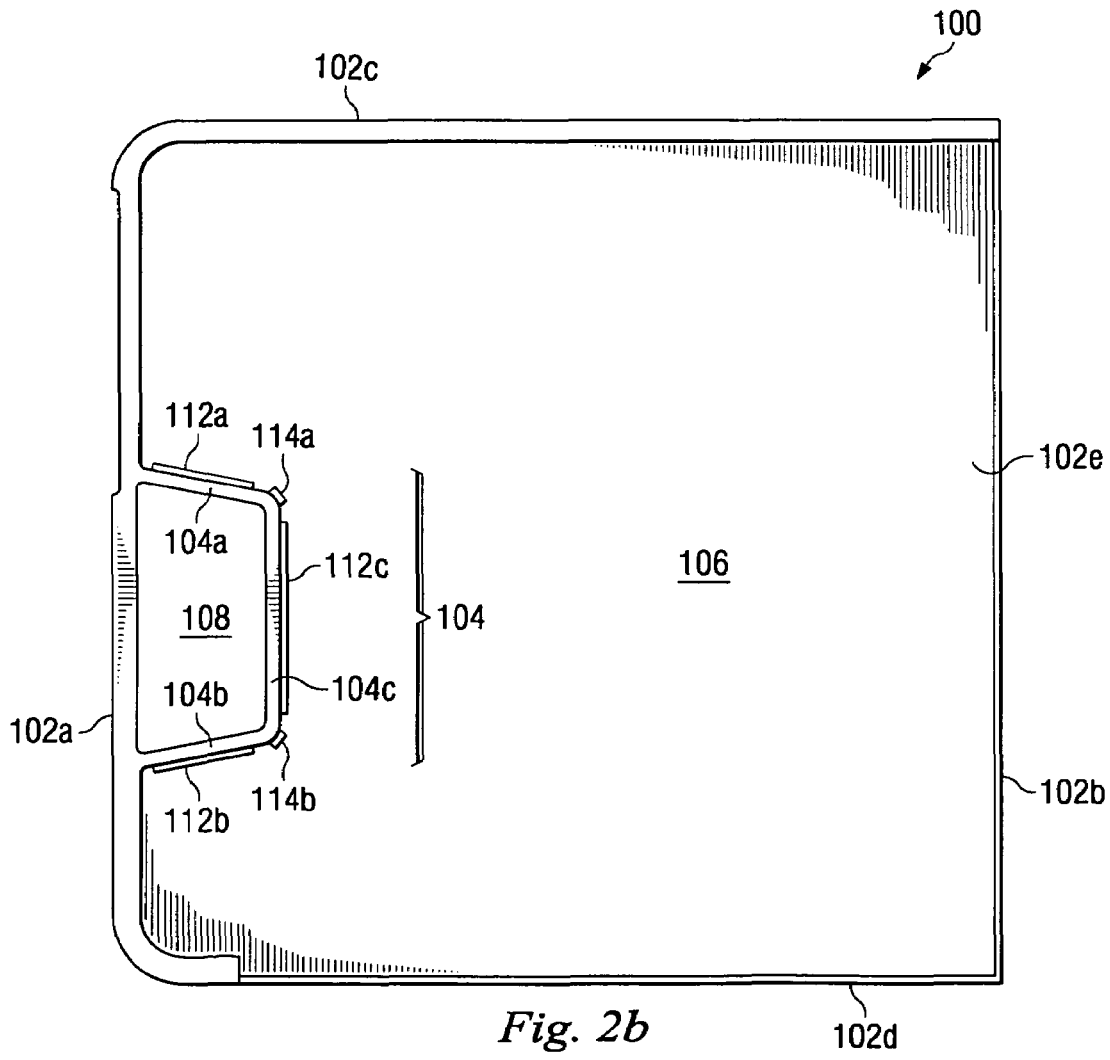
Figure 2A:
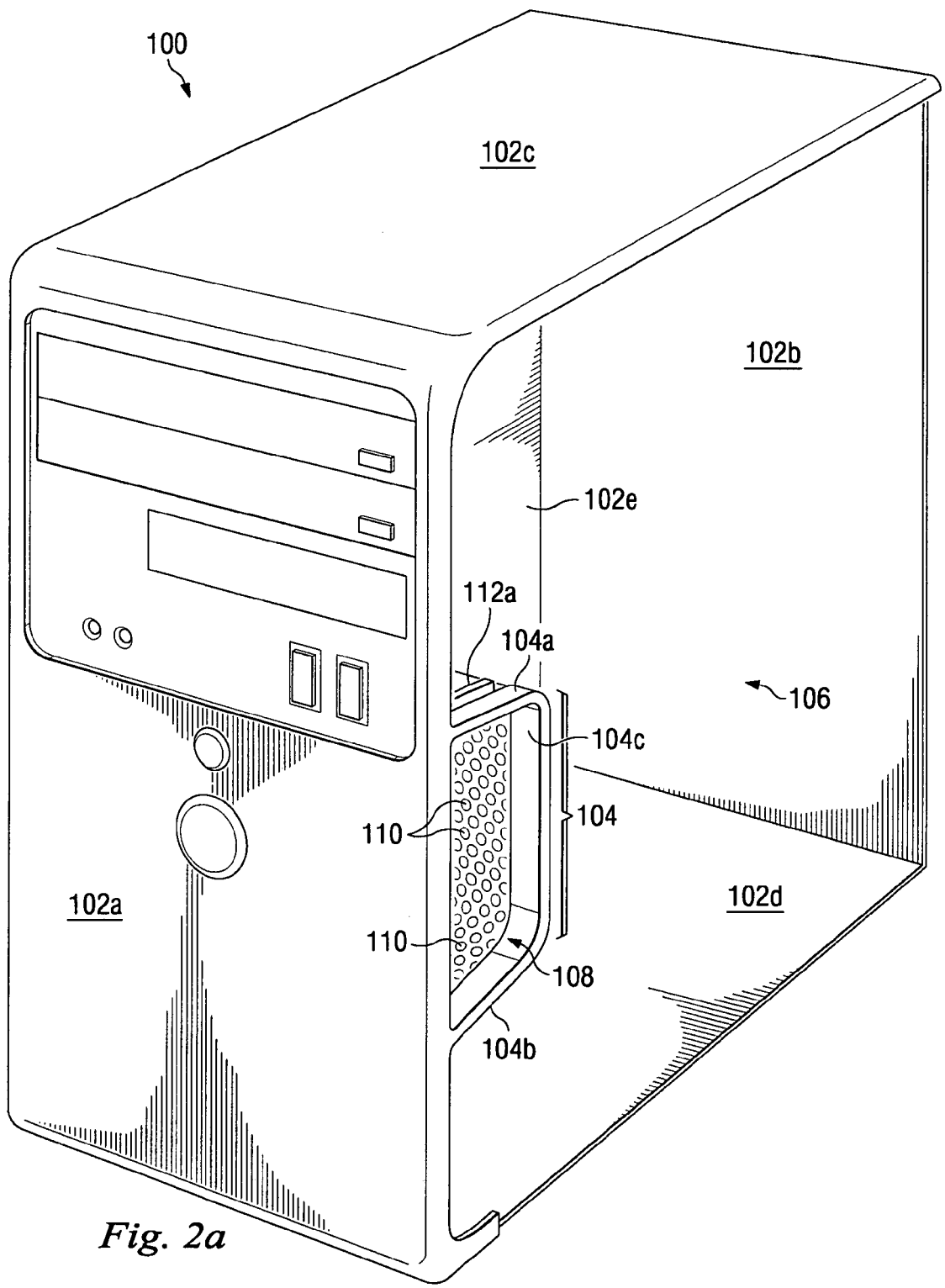
FIG. 2a is a perspective view illustrating an embodiment of a chassis.

Referring now to FIGS. 2a, 2b, and 2c, a chassis 100 which may be, for example, the chassis 26 illustrated in FIG. 1, is illustrated. The chassis 100 includes a front first wall 102a, a rear second wall 102b positioned parallel to and spaced apart from the front first wall 102a, a top third wall 102c extending between the front first wall 102a and the rear second wall 102b, and a bottom fourth wall 102d positioned parallel to and spaced apart fro the top third wall 102c and extending between the front first wall 102a and the rear second wall 102b. A fifth side wall 102e extends between the front first wall 102a, the rear second wall 102b, the top third wall 102c, and the bottom fourth wall 102d. A chassis vent structure 104 extends from the front first wall 102a from a plurality of vent structure walls 104a and 104b which are coupled together and spaced apart by a vent structure wall 104c. The front first wall 102a, the back second wall 102b, the top third wall 102c, the bottom fourth wall 102d define a chassis enclosure 106 positioned between them. The front first wall 102a and the vent structure walls 104a, 104b, and 104c of the chassis vent structure 104 define a chassis venting passageway 108 positioned between them and extending into the chassis enclosure 106 and through the chassis 100. The vent structure walls 104a, 104b, and 104c of the chassis vent structure 104 also define a plurality of apertures 110 extending through the vent structure walls 104a, 104b, and 104c from the chassis enclosure 106 to the chassis venting passageway 108. A plurality of electromagnetic interference gaskets 112a, 112b, and 112c are coupled to vent structure walls 104a, 104b, and 104c, respectively, and positioned along an edge of each of the vent structure walls 104a, 104b, and 104c, respectively. A plurality of cover coupling tabs 114a and 114b extend from the chassis vent structure 104 along its edge. In an embodiment, the front first wall 102a includes a solid wall portion that obscures the chassis vent structure 104 from sight when the chassis 100 is viewed from directly in front of the front first wall 102a, as illustrated. In an embodiment, the chassis vent structure 104 may extend only partially into the chassis 100 rather than through the chassis 100.

Referring now to FIGS. 2c and 2d, in an embodiment, a fan 200 may be coupled to the fifth side wall 102e and positioned in the chassis enclosure 106 of chassis 100 and adjacent the vent structure wall 104c of chassis vent structure 104. In an embodiment, the fan 200 may be a conventional fan known in the art.

Referring now to FIGS. 3a and 3b, a chassis cover 300 is illustrated. Chassis cover 300 includes a base section 302 having a front first side 302a, a rear second side 302b located opposite the front first side 302a, a top third side 302c, and a bottom fourth side 302d located opposite the top third side 302c. A passageway channel 304 is defined by the base section 302 and located on the front first side 302a. A plurality of chassis coupling tabs 306 are located around the edge of the base section 302 and extend from the front first side 302a, the rear second side 302b, the top third side 302c, the bottom fourth side 302d, and passageway channel 304.

Figure 4A:
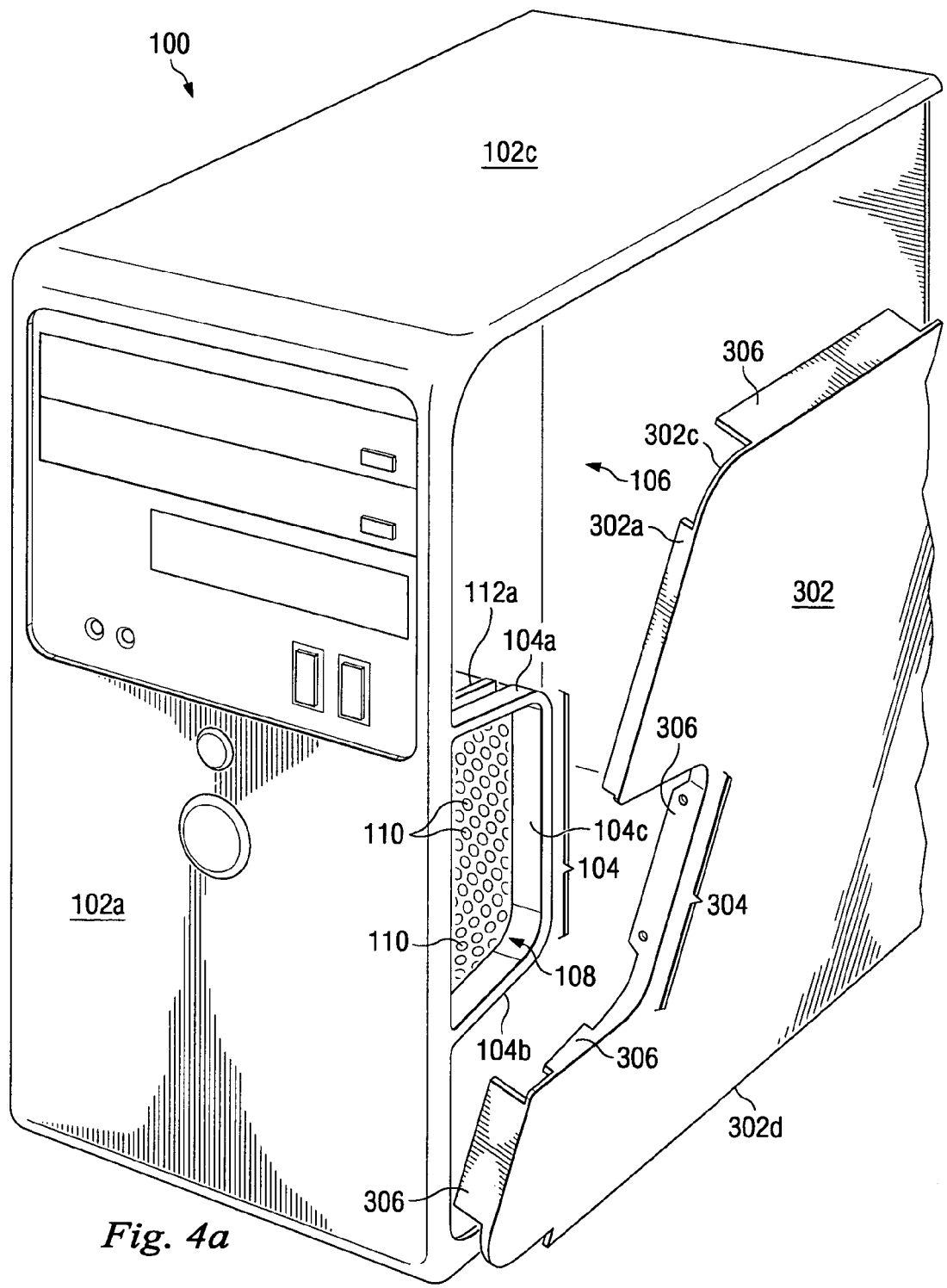
Figure 4B:
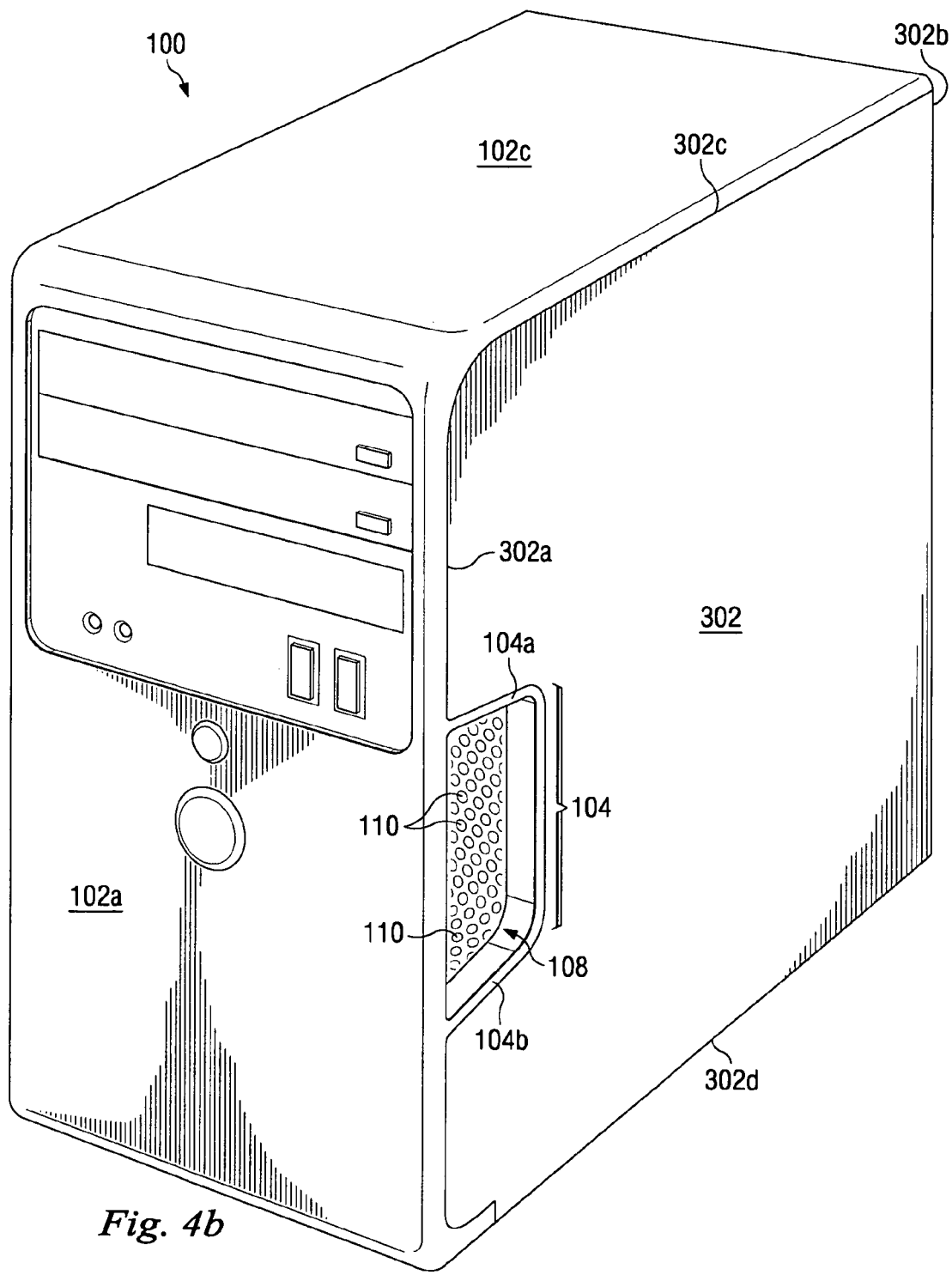

Referring now to FIGS. 2b, 4a, and 4b, in operation, an IHS such as, for example, the IHS 10 illustrated in FIG. 1, which may include heat producing components such as, for example, the microprocessor 12 illustrated in FIG. 1, may be mounted in the chassis enclosure 106 of chassis 100. A fan such as, for example, the fan 200 illustrated in FIG. 2d may be mounted between the heat producing component and the chassis vent structure 104. The chassis cover 300 may then be coupled to the chassis 100 by coupling the front first side 302a on chassis cover 300 to the front first side 102a on chassis 100, the rear second side 302b on chassis cover 300 to the rear second side 102b on chassis 100, the top third side 302c on chassis cover 300 to the top third side 102c on chassis 100, and the bottom fourth side 302d on chassis cover 300 to the bottom fourth side 102d on chassis 100 using the chassis coupling tabs 306 on chassis cover 300, the cover coupling tabs 114a and 114b on chassis 100, and conventional methods known in the art. With the chassis cover 300 coupled to the chassis 100, the electromagnetic interference gaskets 112a, 112b, and 112c help to prevent electromagnetic interference from escaping from the chassis enclosure 106. During operation of the heat producing components mounted within the chassis enclosure 106, the fan may be operated in order to vent hot air from the chassis enclosure 106, through the chassis vent structure 104 by way of the plurality of apertures 110 in the vent structure walls 104a, 104b, and 104c in the chassis vent structure 104, and out of the chassis 100 through the chassis venting passageway 108. Furthermore, the chassis 100 may be lifted and transported by using the chassis venting passageway 108 and the front first wall 102a as a handle by grasping the portion of the front first side 102a of the chassis 100 which is adjacent the chassis vent structure 104. Thus, a means is provided for venting the chassis 100 through the front of the system while obscuring the venting means from sight, while providing a handle for lifting and transporting the chassis 100.

Figure 5A:
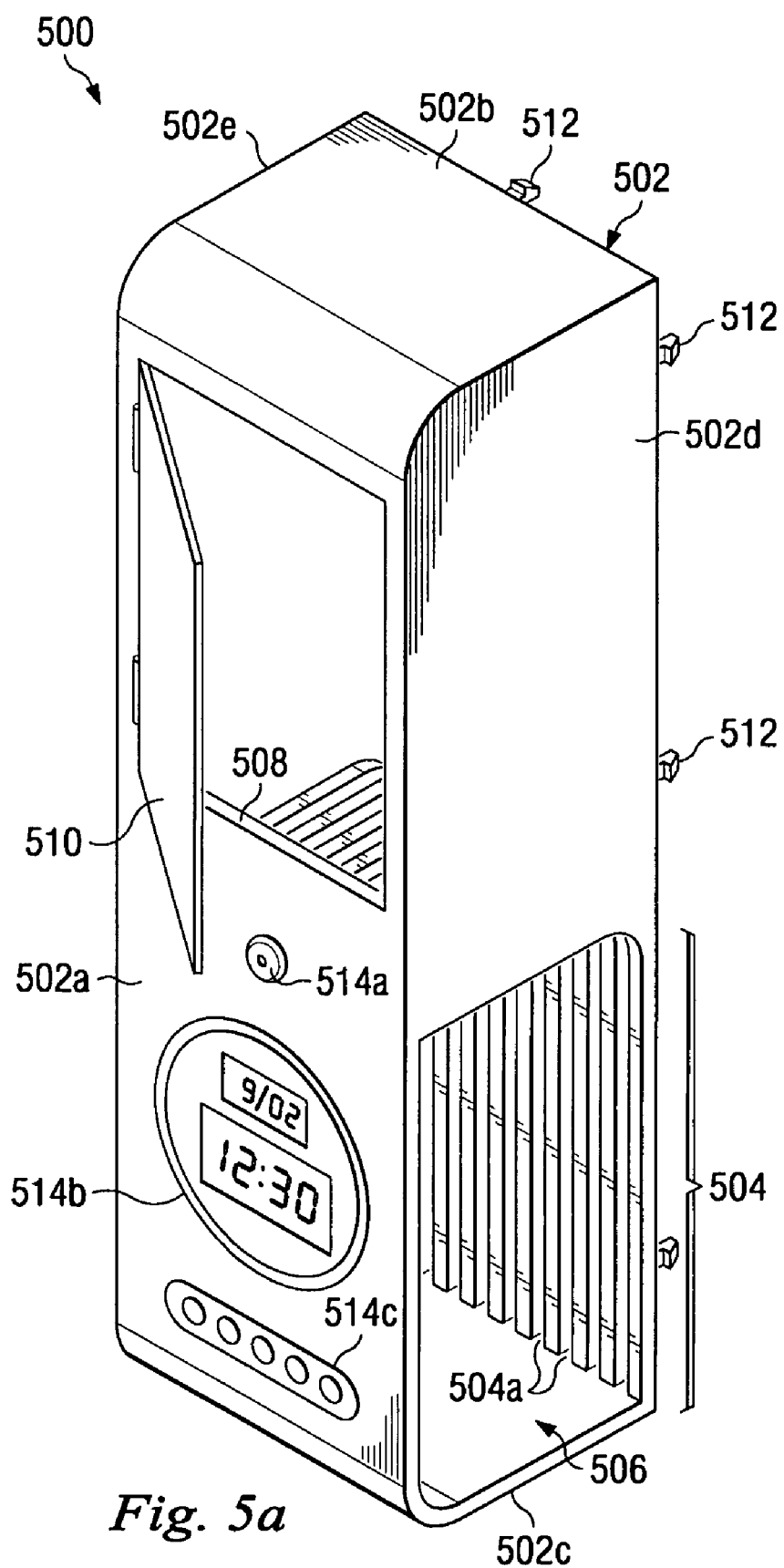
FIG. 5a is a front perspective view illustrating an embodiment of a chassis venting apparatus.
Figure 5B:
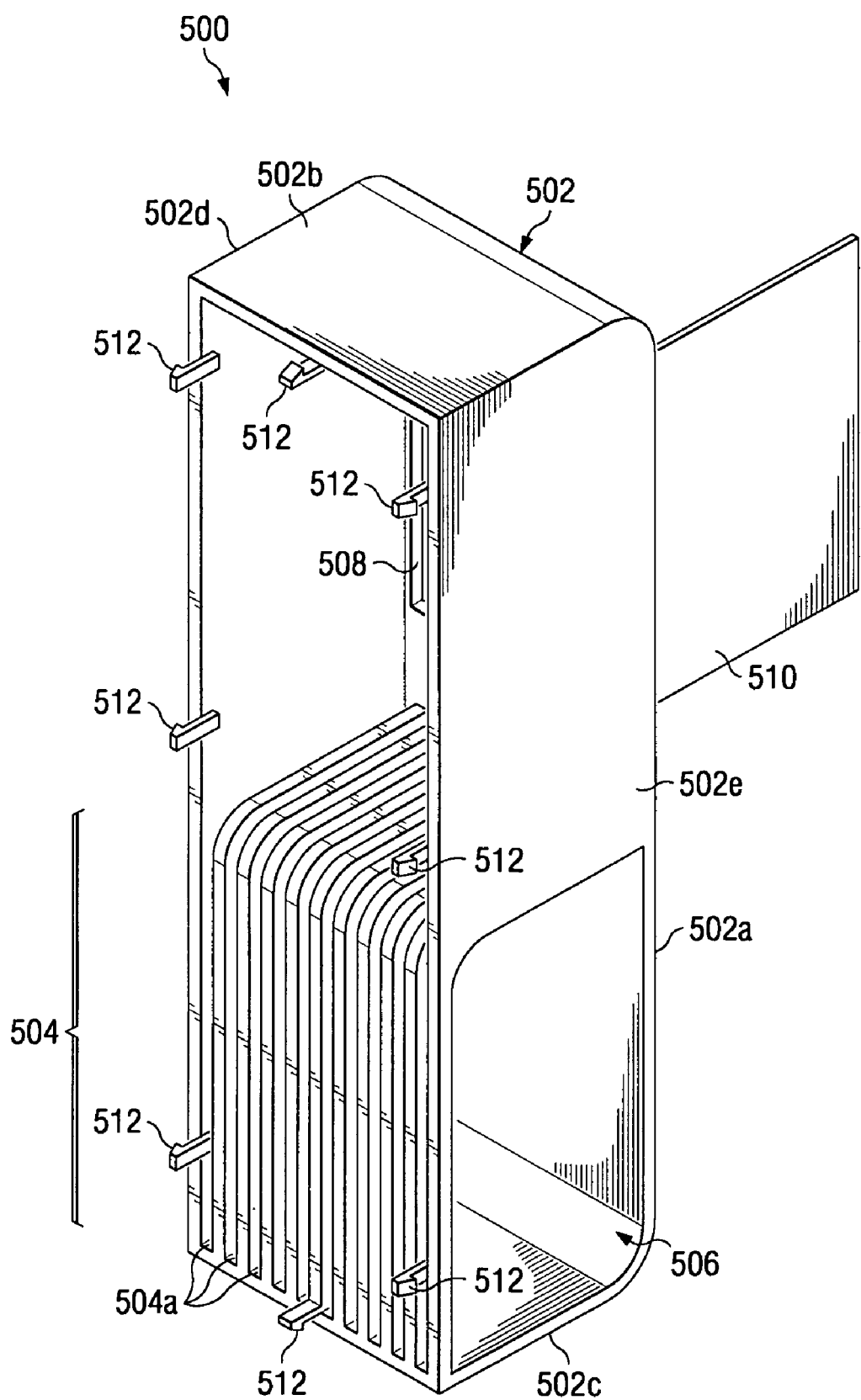

Referring now to FIGS. 5a and 5b, a chassis venting apparatus 500 is illustrated. The chassis venting apparatus 500 includes a chassis wall base member 502 having a front wall 502a, a top wall 502b extending from the front wall 502a, a bottom wall 502c extending from the front wall 502a opposite the top wall 502b, and a pair of opposing side walls 502d and 502e extending from opposite sides of the front wall 502a and between the top wall 502b and the bottom wall 502c. A chassis vent structure 504 is located on the chassis wall base member 502 and extends between the front wall 502a, the bottom wall 502c, and the side walls 502d and 502e. The chassis vent structure 504 defines a plurality of venting channels 504a along its length. A chassis venting passageway 506 is defined between the chassis vent structure 504 and the front wall 502a of the chassis wall base member 502 and extends through the chassis wall base member 502 from the side wall 502d to the side wall 502e. In an embodiment, a portion of the front wall 502a located immediately adjacent the chassis venting passageway 506 and adjacent the chassis vent structure 504 is a solid wall such that the chassis vent structure 504 is not visible through the front wall 502a of the chassis wall base member 502. A component access passageway 508 is defined by the chassis wall base member 502 and located on the front wall 502a between the top wall 502b and the chassis vent structure 504. An access door 510 is pivotally coupled to the chassis wall base member 502 and located adjacent the component access passageway 508. A plurality of chassis coupling features 512 extend from the top wall 502b, the bottom wall 502c, and the side walls 502d and 502e of the chassis wall base member 502. In an embodiment, a plurality of features may be included on the chassis wall base member 502 such as, for example, a power button 514a, a clock 514b, a indicator light 514c, and/or a variety of other computer chassis features known in the art.

Figure 6:
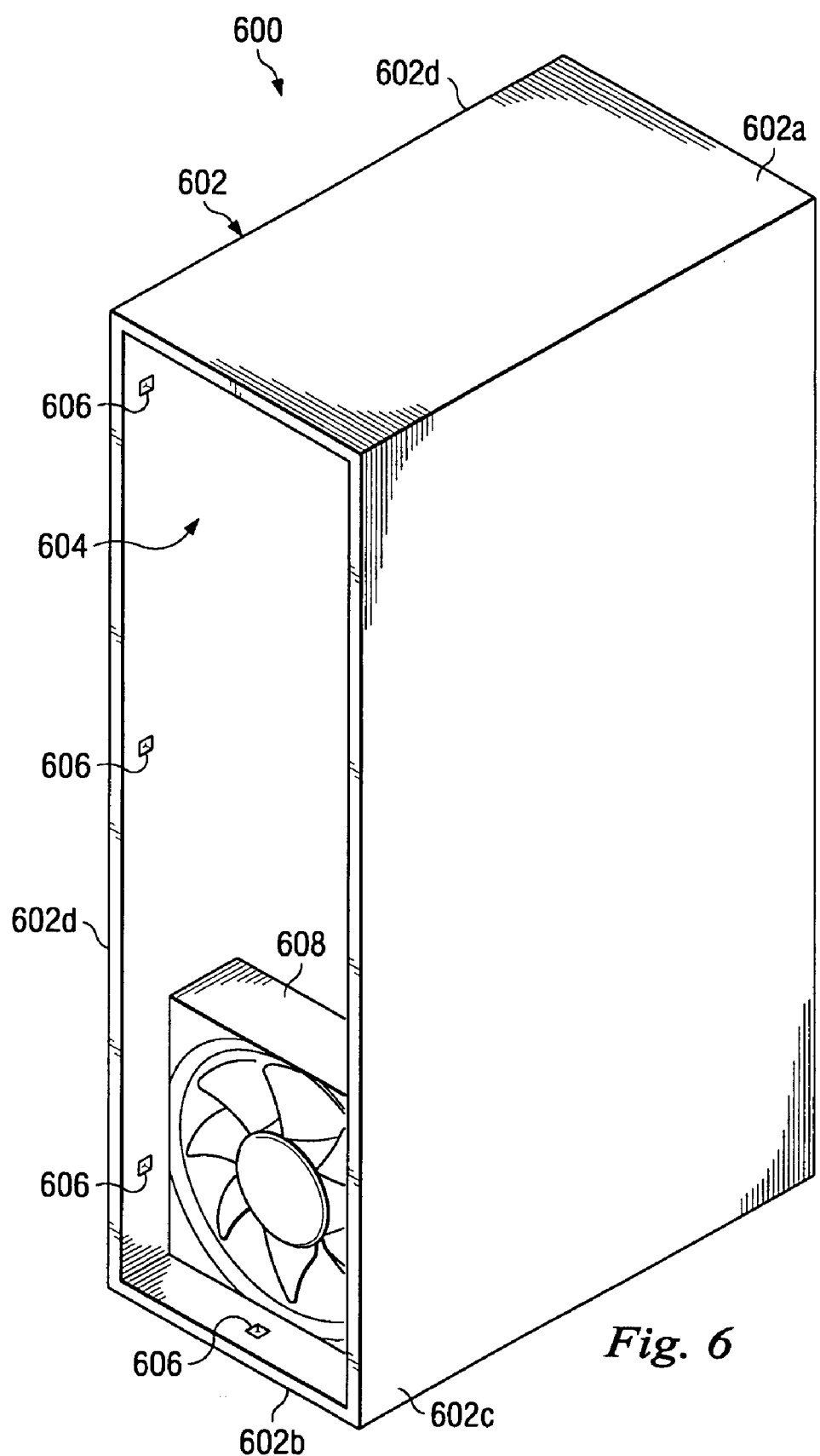
FIG. 6 is a perspective view illustrating an embodiment of a chassis used with the chassis venting apparatus of FIGS. 5a and 5b.

Referring now to FIG. 6, a chassis 600 is illustrated. In an embodiment, the chassis 600 may be the chassis 26, described above with reference to FIG. 1, and may house some or all of the components of the IHS 10, described above with reference to FIG. 1. The chassis 600 includes a base 602 having a top wall 602a, a bottom wall 602b located opposite the top wall 602a, and a pair of opposing side walls 602c and 602d extending between the top wall 602a and the bottom wall 602b in a substantially parallel and spaced apart orientation. An IHS housing 604 is defined by the chassis 600 between the top wall 602a, the bottom wall 602b, and the side walls 602c and 602d. A plurality of chassis wall coupling features 606 are defined by the chassis 600 and located on the top wall 602a (not shown), the side wall 602c (not shown), the bottom wall 602b, and the side wall 602d. A fan 608 is located in the IHS housing 604 adjacent the bottom wall 602b and the side walls 602c and 602d.

Figure 7C:
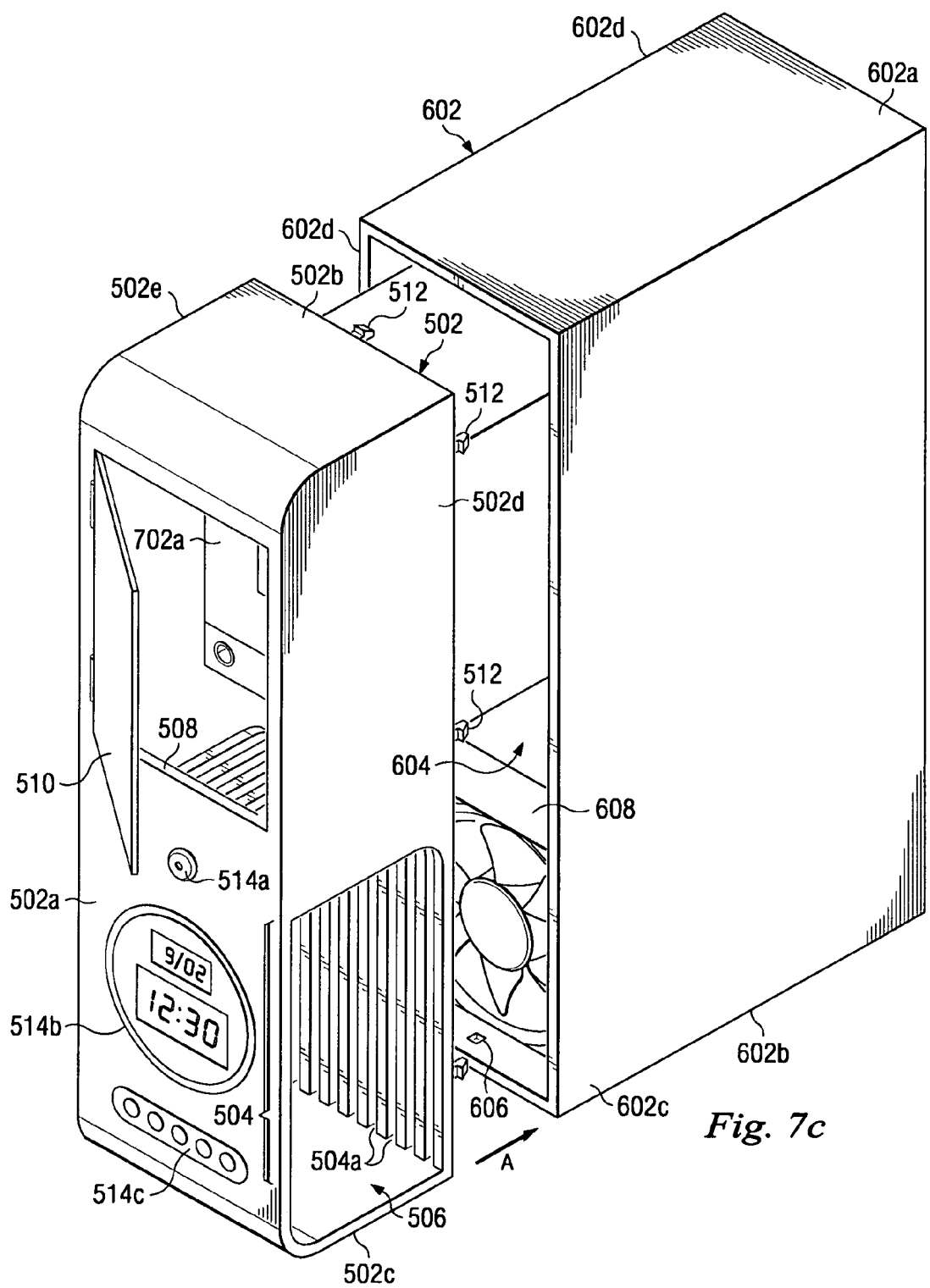
FIG. 7c is a perspective view illustrating an embodiment of the chassis wall base member of FIGS. 5a and 5b being coupled to the chassis of FIG. 7b.
Figure 7D:
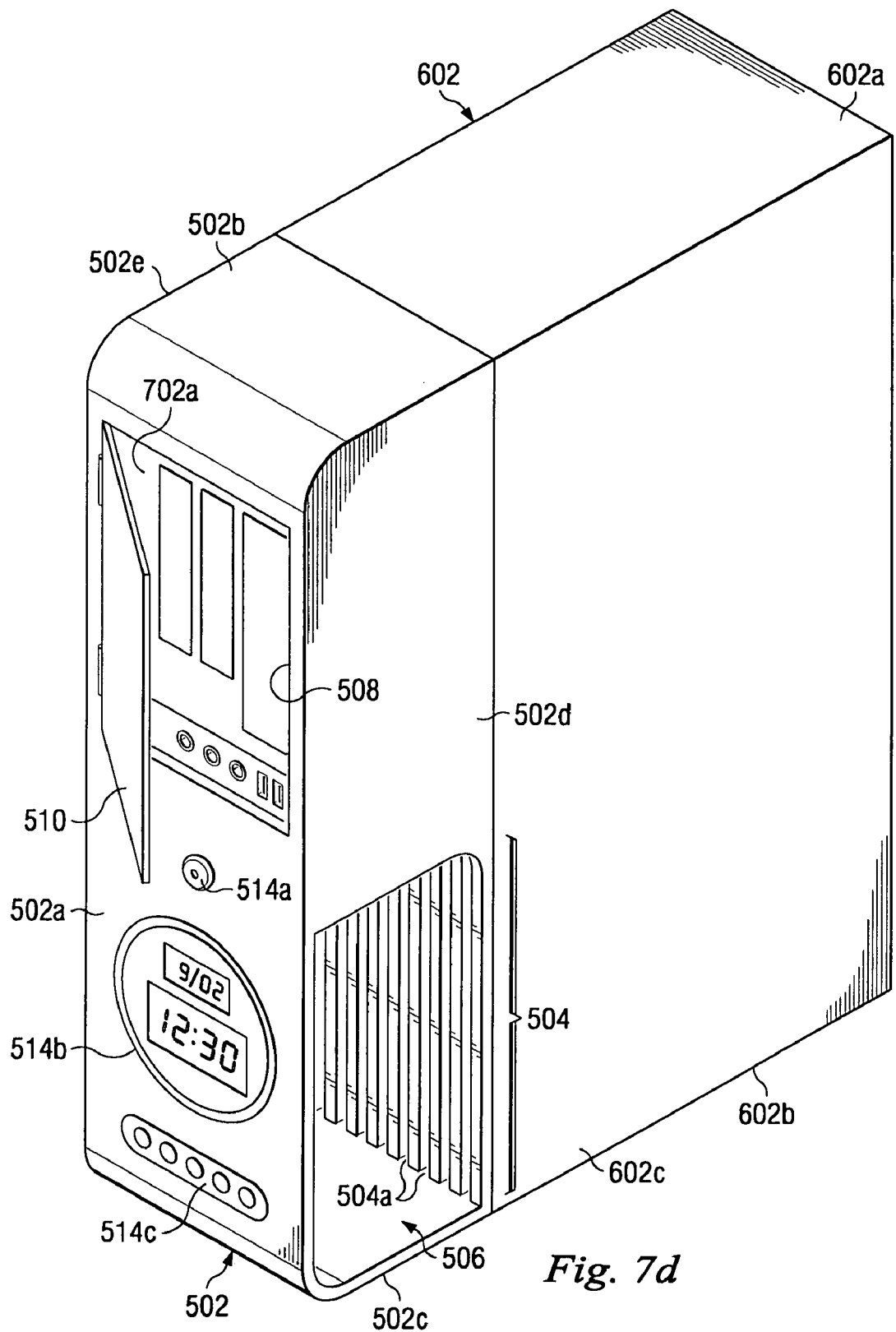
FIG. 7d is a perspective view illustrating an embodiment of the chassis wall base member of FIGS. 5a and 5b coupled to the chassis of FIG. 7b.

Referring now to FIGS. 5a, 5b, 6, 7a, 7b, 7c, and 7d, a method 700 for venting a chassis is illustrated. The method 700 begins at step 702 where the chassis 600, described above with reference to FIG. 6, is provided. In an embodiment, an IHS component 702a may be coupled to the chassis 600 and located in the IHS housing 604 such that it is adjacent the top wall 602a and the two side walls 602c and 602d, and a portion of the component 702a extends from the chassis 600 and out of the IHS housing 604, as illustrated in FIG. 7b. The method 700 then proceeds to step 704 where the chassis venting apparatus 500, described above with reference to FIGS. 5a and 5b, is coupled to the chassis 600. The chassis wall base member 502 is positioned adjacent the chassis 600 such it is adjacent the IHS housing 604 with the top wall 502b of the chassis wall base member 502 adjacent the top wall 602a of the chassis 600, the bottom wall 502c of the chassis wall base member 502 adjacent the bottom wall 602b of the chassis 600, and the side walls 502d and 502e of the chassis wall base member 502 adjacent the side walls 602c and 602d, respectively, of the chassis 600, as illustrated in FIG. 7c. The chassis wall base member 502 is then moved in a direction A such that the chassis coupling features 512 on the chassis wall base member 502 engage respective chassis wall coupling features 606 defined by the chassis 600, coupling the chassis wall base member 502 to the chassis 600, as illustrated in FIG. 7d. The method 700 then proceeds to step 706, where air is vented out of the chassis 600. The fan 608 may be operated to move air from the IHS housing 604 through the chassis vent structure 504 and out of the chassis 600. The method 700 may then proceed to step 708 where the chassis 600 is lifted. The front wall 502a of the chassis wall base member 502 may be used as a handle and grasped through the chassis venting passageway 506 and, due to the coupling of the chassis wall base member 502 to the chassis 600, when the chassis wall base member 502 is lifted, the chassis 600 is lifted along with it. Thus, a means is provided for venting the chassis 600 through the front of the system while obscuring the venting means from sight, while also providing a handle for lifting and transporting the chassis 600.

Figure 8A:
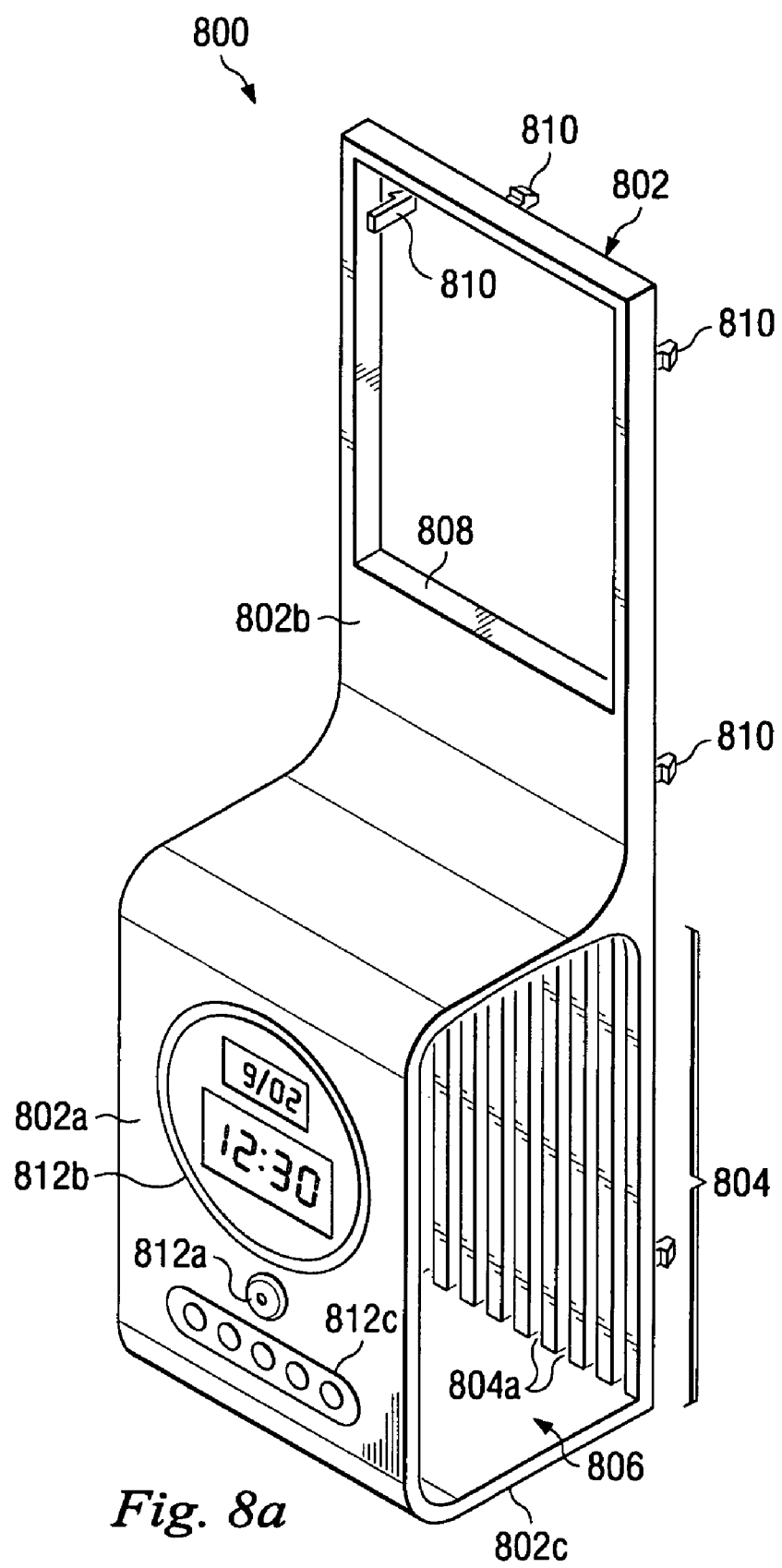
FIG. 8a is a front perspective view illustrating an embodiment of a chassis venting apparatus.
Figure 8B:
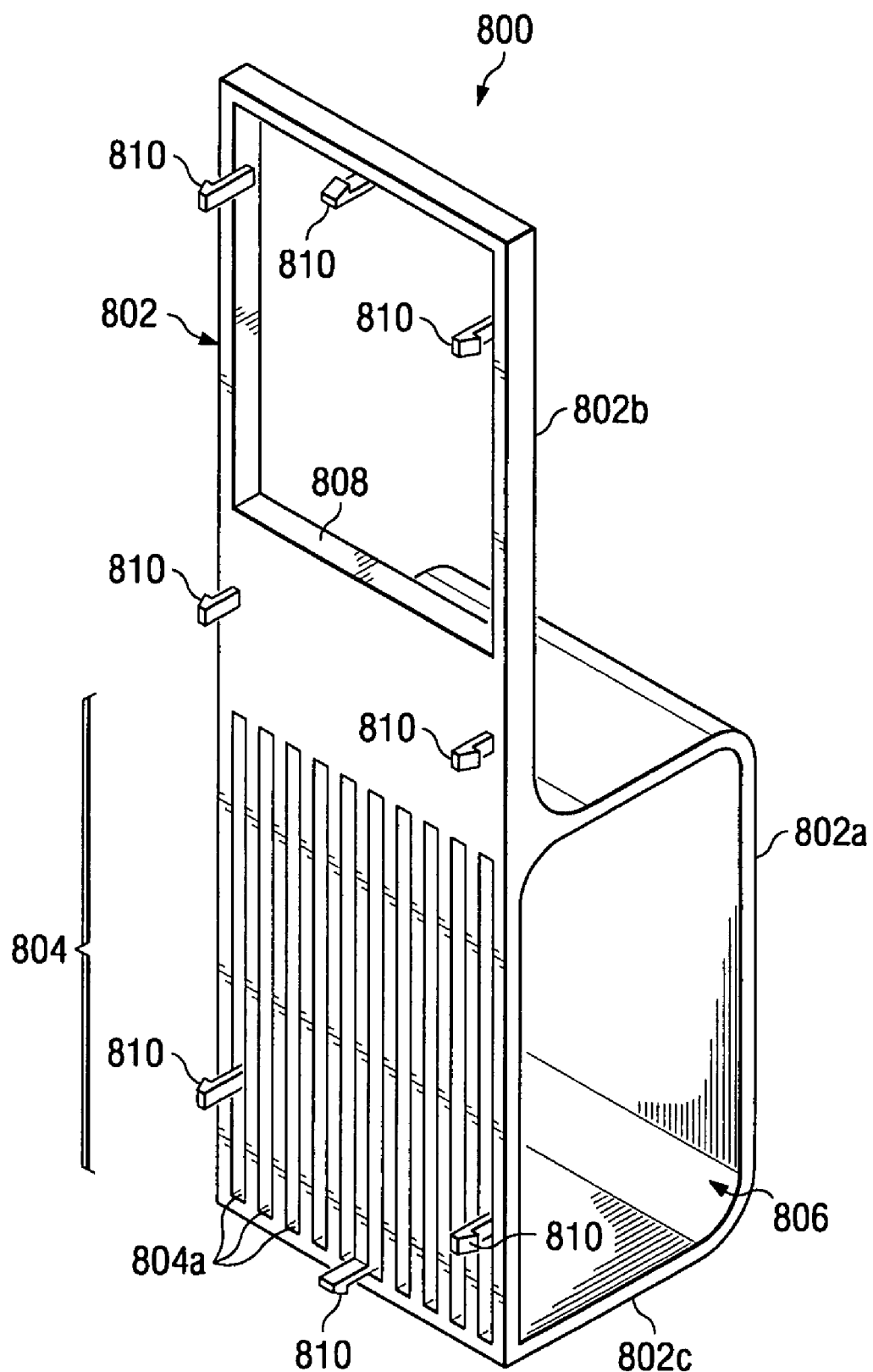

Referring now to FIGS. 8a and 8b, a chassis venting apparatus 800 is illustrated. The chassis venting apparatus 800 includes a chassis wall base member 802 having a lower front wall 802a, an upper wall 802b extending from the lower front wall 802a, and a bottom wall 802c extending from the lower front wall 802a opposite the upper wall 802b. A chassis vent structure 804 is located on the chassis wall base member 802 and extends between the bottom wall 802c and the upper wall 802b. The chassis vent structure 804 defines a plurality of venting channels 804a along its length. A chassis venting passageway 806 is defined between the chassis vent structure 804 and the lower front wall 802a and extends through the chassis wall base member 502. In an embodiment, a portion of the lower front wall 802a located immediately adjacent the chassis venting passageway 806 and adjacent the chassis vent structure 804 is a solid wall such that the chassis vent structure 804 is not visible through the lower front wall 802a of the chassis wall base member 802. A component access passageway 808 is defined by the chassis wall base member 802 and located on the upper wall 802b. A plurality of chassis coupling features 810 extend from the chassis wall base member 800 adjacent the bottom wall 802c, around the chassis vent structure 804, and about the perimeter of the upper wall 802b. In an embodiment, a plurality of features may be included on the chassis wall base member 802 such as, for example, a power button 812a, a clock 812b, a indicator light 812c, and/or a variety of other computer chassis features known in the art.

Figure 9C:
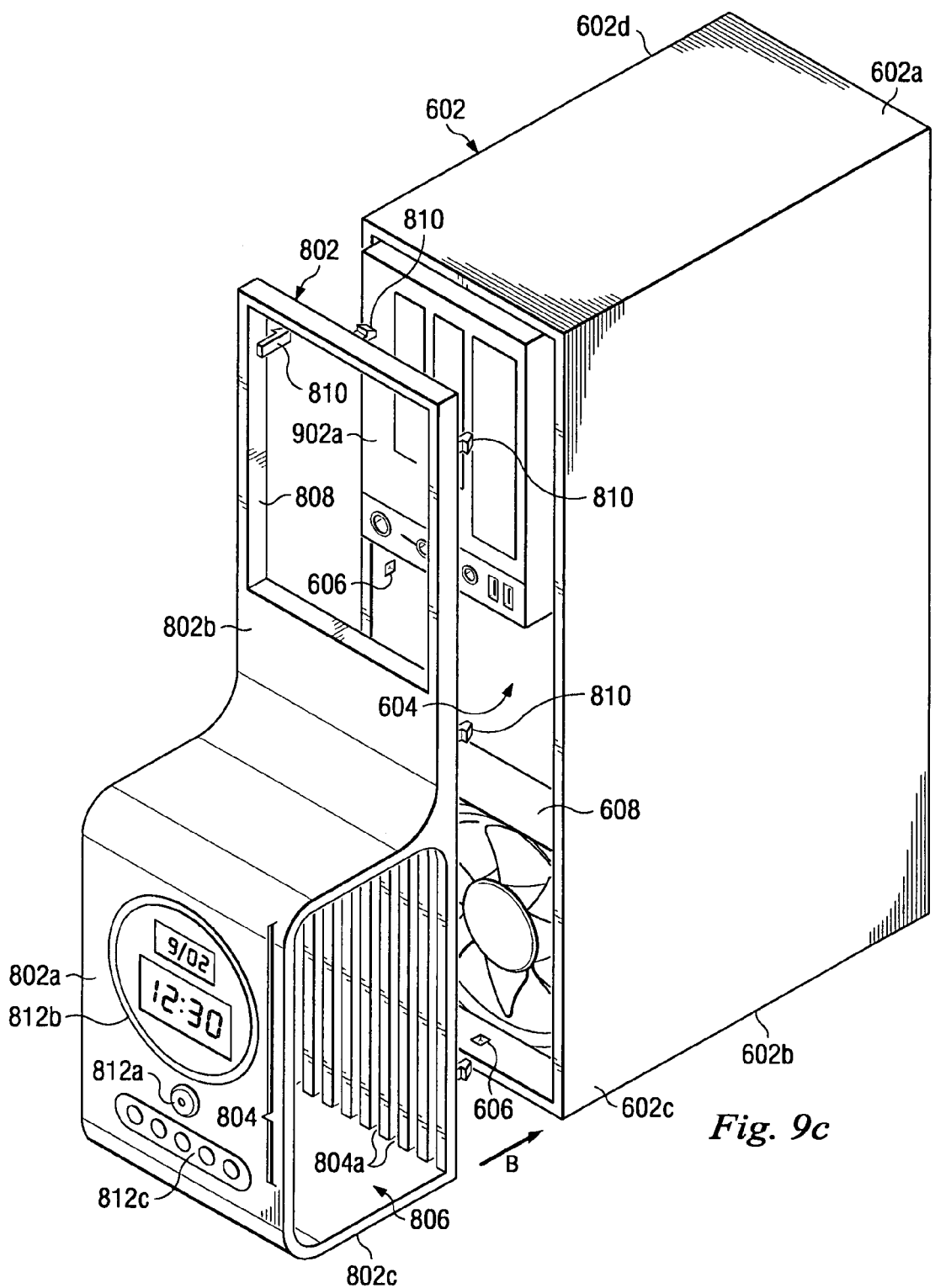
FIG. 9c is a perspective view illustrating an embodiment of the chassis wall base member of FIGS. 8a and 8b being coupled to the chassis of FIG. 9b.
Figure 9D:
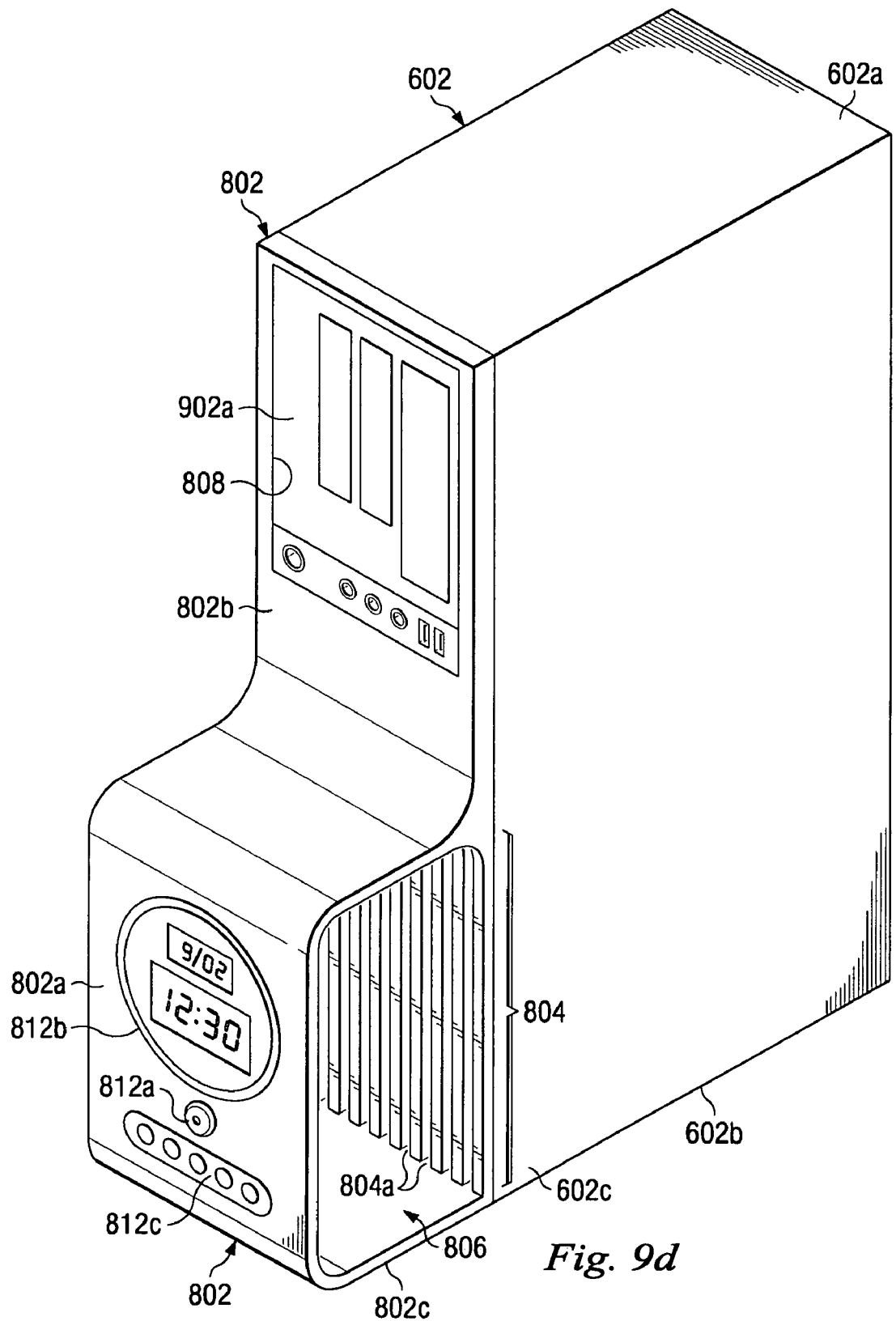
FIG. 9d is a perspective view illustrating an embodiment of the chassis wall base member of FIGS. 8a and 8b coupled to the chassis of FIG. 9b.

Referring now to FIGS. 6, 8a, 8b, 9a, 9b, 9c, and 9d, a method 900 for venting a chassis is illustrated. The method 900 begins at step 902 where the chassis 600, described above with reference to FIG. 6, is provided. In an embodiment, an IHS component 902a may be coupled to the chassis 600 and located in the IHS housing 604 such that it is adjacent the top wall 602a and the two side walls 602c and 602d, and that a portion of the component 902a extends from the chassis 600 and out of the IHS housing 604, as illustrated in FIG. 9b. The method 900 then proceeds to step 904 where the chassis venting apparatus 800, described above with reference to FIGS. 8a and 8b, is coupled to the chassis 600. The chassis wall base member 802 is positioned adjacent the chassis 600 such that it is adjacent the IHS housing 604 with the upper wall 502b of the chassis wall base member 802 adjacent the IHS component 902a in the chassis 600 and the bottom wall 802c of the chassis wall base member 802 adjacent the bottom wall 602b of the chassis 600, as illustrated in FIG. 9c. The chassis wall base member 802 is then moved in a direction B such that the chassis coupling features 810 on the chassis wall base member 802 engage respective chassis wall coupling features 606 defined by the chassis 600, coupling the chassis wall base member 802 to the chassis 600, as illustrated in FIG. 9d. The method 900 then proceeds to step 906, where air is vented out of the chassis 600. The fan 608 may be operated to move air from the IHS housing 604 through the chassis vent structure 804 and out of the chassis 600. The method 900 may then proceed to step 908 where the chassis 600 is lifted. The lower front wall 802a of the chassis wall base member 802 may be used as a handle and grasped through the chassis venting passageway 806 and, due to the coupling of the chassis wall base member 802 to the chassis 600, when the chassis wall base member 802 is lifted, the chassis 600 is lifted along with it. Thus, a means is provided for venting the chassis 600 through the front of the system while obscuring the venting means from sight, while also providing a handle for lifting and transporting the chassis 600.

Figure 10A:
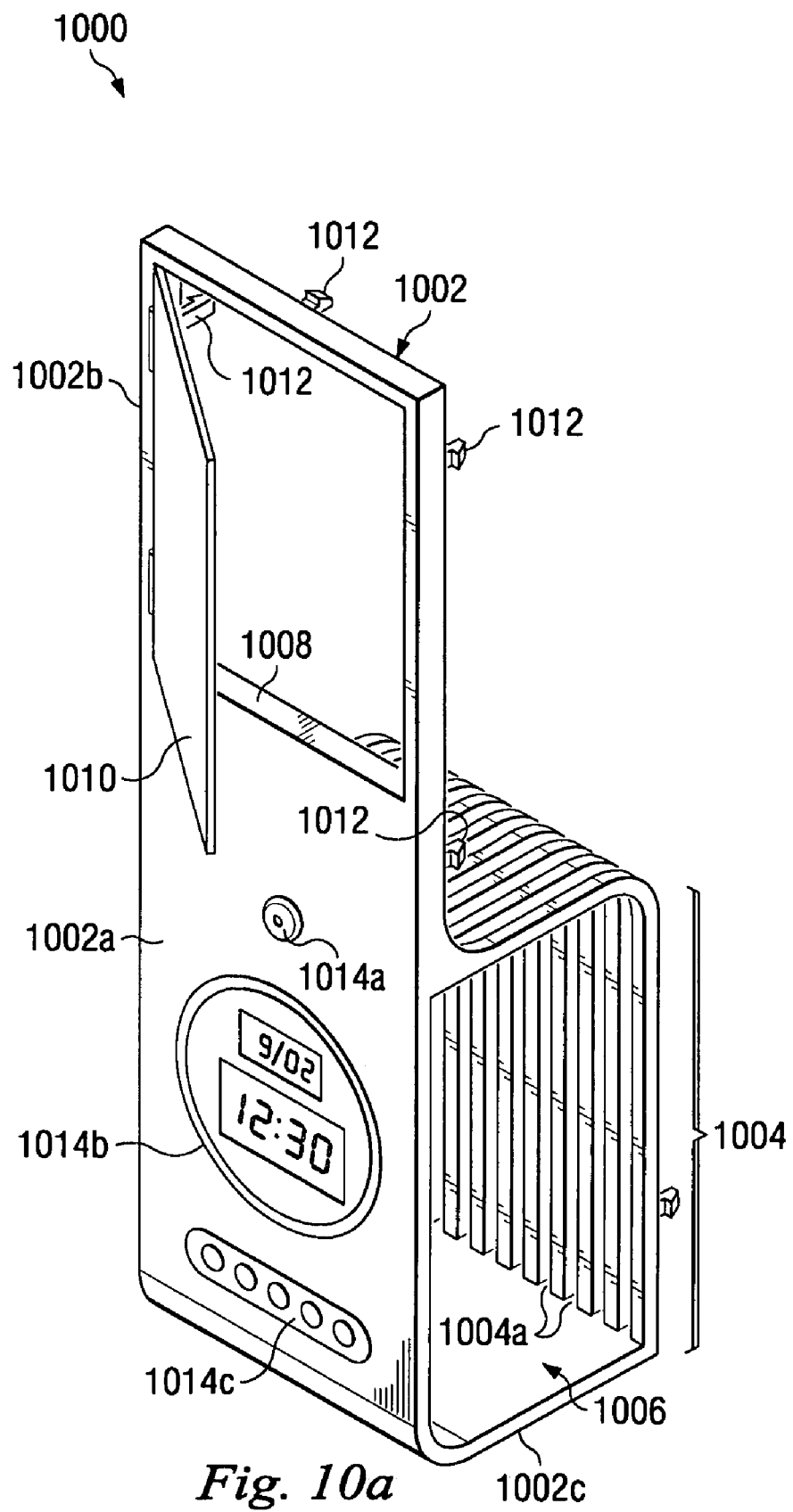
FIG. 10a is a front perspective view illustrating an embodiment of a chassis venting apparatus.
Figure 10B:
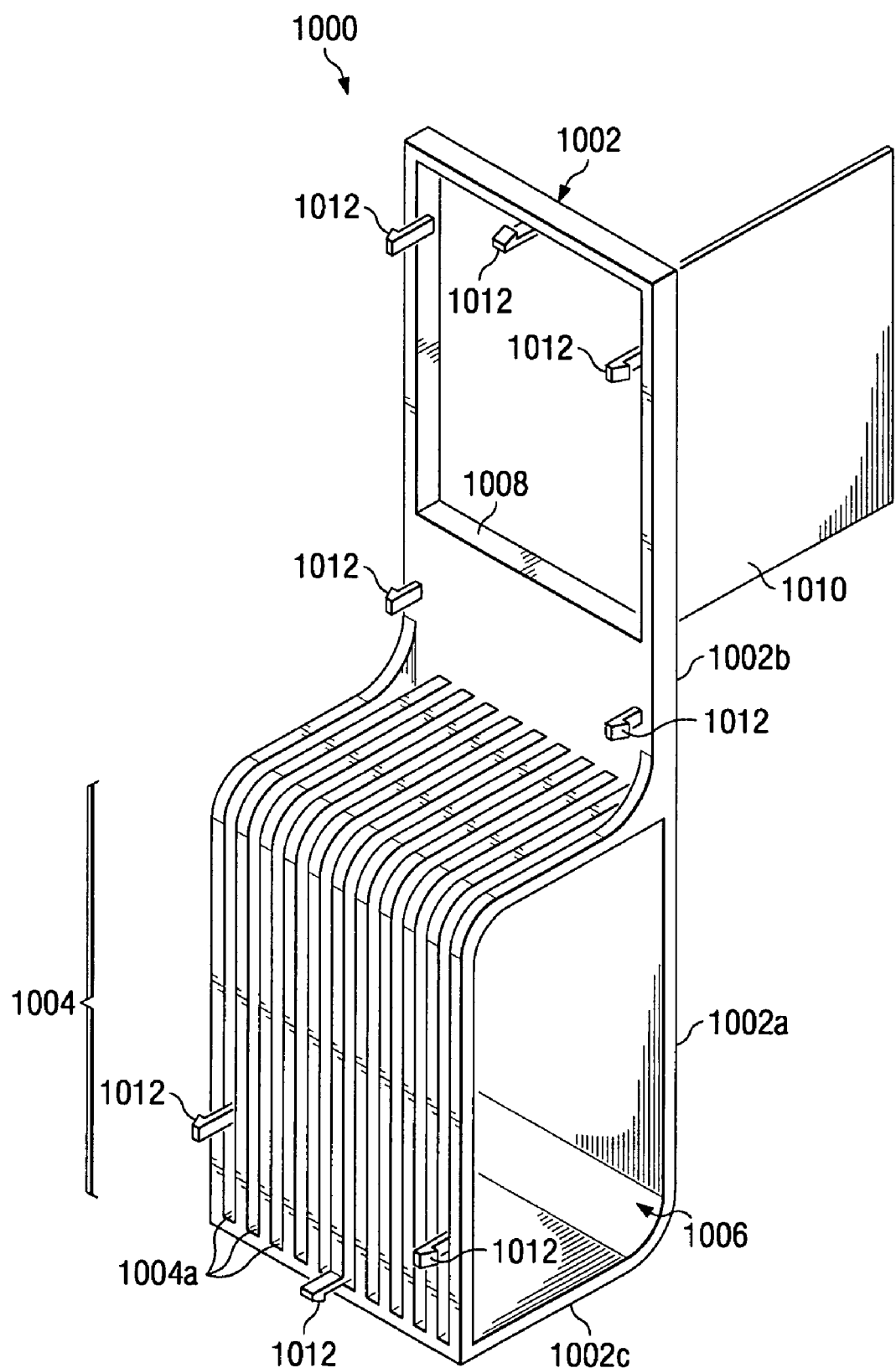

Referring now to FIGS. 10a and 10b, a chassis venting apparatus 1000 is illustrated. The chassis venting apparatus 1000 includes a chassis wall base member 1002 having a lower front wall 1002a, an upper front wall 1002b extending from the lower front wall 1002a, and a bottom wall 1002c extending from the lower front wall 1002a opposite the upper front wall 1002b. A chassis vent structure 1004 is located on the chassis wall base member 1002 and extends between the bottom wall 502c and the upper front wall 1002b. The chassis vent structure 1004 defines a plurality of venting channels 1004a along its length. A chassis venting passageway 1006 is defined between the chassis vent structure 1004 and the lower front wall 1002a. In an embodiment, a portion of the lower front wall 1002a is located immediately adjacent the chassis venting passageway 1006 and adjacent the chassis vent structure 1004 is a solid wall such that the chassis vent structure 1004 is not visible through the lower front wall 1002a of the chassis wall base member 1002. A component access passageway 1008 is defined by the chassis wall base member 1002 and located on the upper front wall 1002a adjacent the chassis vent structure 1004. An access door 1010 is pivotally coupled to the chassis wall base member 1002 adjacent the component access passageway 1008. A plurality of chassis coupling features 1012 extend from the upper front wall 1002b, the bottom wall 1002c, and adjacent the chassis vent structure 1004. In an embodiment, a plurality of features may be included on the chassis wall base member 1002 such as, for example, a power button 1014a, a clock 1014b, a indicator light 1014c, and/or a variety of other computer chassis features known in the art.

Figure 11:
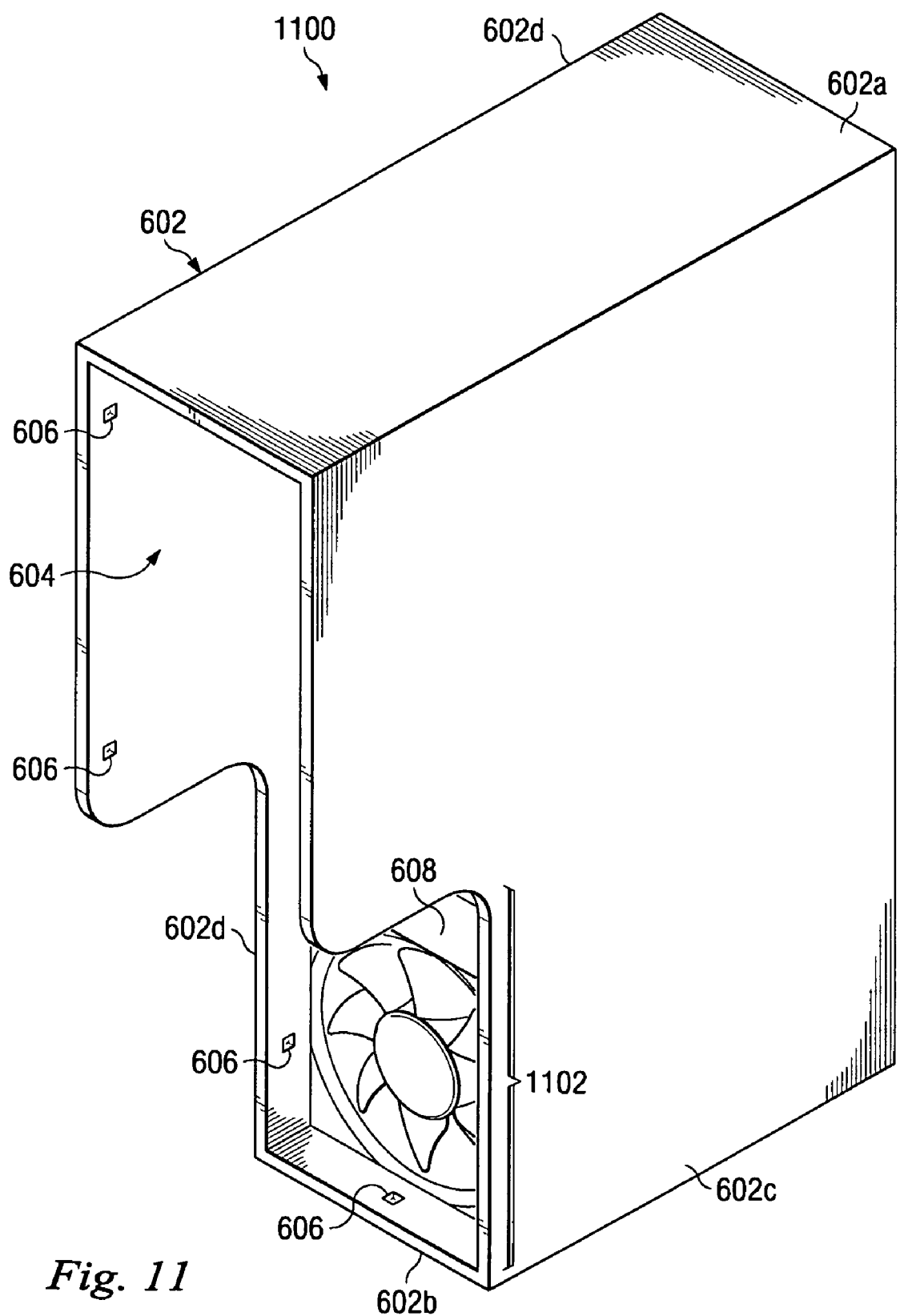
FIG. 11 is a perspective view illustrating an embodiment of a chassis used with the chassis venting apparatus of FIGS. 10a and 10b.

Referring now to FIG. 11, a chassis 1100 is substantially similar in design and operation to the chassis 600, described above with reference to FIG. 6, with the provision of a chassis vent structure channel 1102 defined by the chassis 1100 and located adjacent the bottom wall 602b and the fan 608.

Figure 12D:
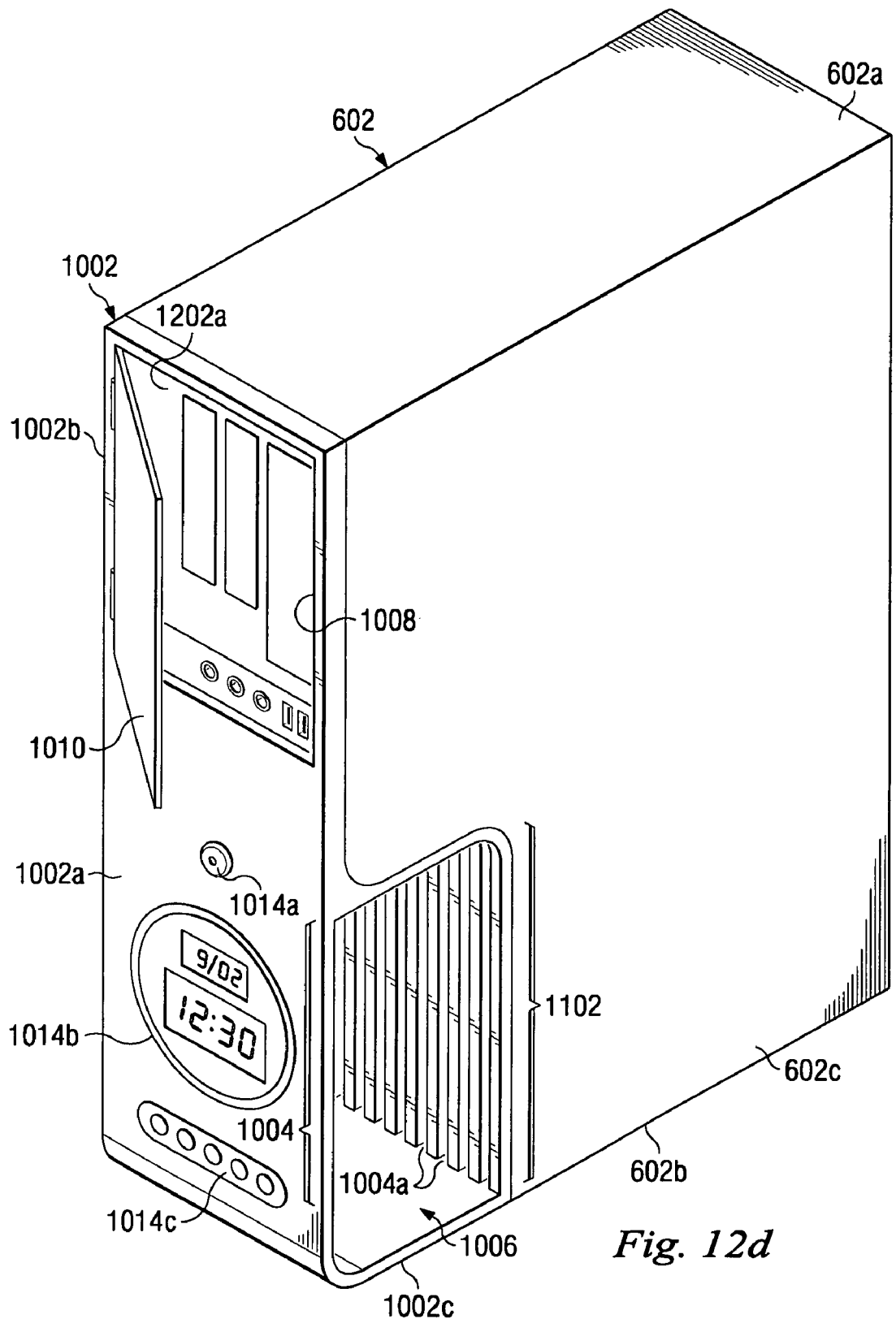
FIG. 12d is a perspective view illustrating an embodiment of the chassis wall base member of FIGS. 10a and 10b coupled to the chassis of FIG. 12b.

Referring now to FIGS. 10a, 10b, 11, 12a, 12b, 12c, and 12d, a method 1200 for venting a chassis is illustrated. The method 1200 begins at step 1202 where the chassis 1100, described above with reference to FIG. 11, is provided. In an embodiment, an IHS component 1202a may be coupled to the chassis 1100 and located in the IHS housing 604 such that it is adjacent the top wall 602a and the two side walls 602c and 602d, and that a portion of the component 1202a extends from the chassis 1100 and out of the IHS housing 604, as illustrated in FIG. 12b. The method 1200 then proceeds to step 1204 where the chassis venting apparatus 1000, described above with reference to FIGS. 10a and 10b, is coupled to the chassis 1100. The chassis wall base member 1002 is positioned adjacent the chassis 1100 such that it is adjacent the IHS housing 604 with the upper front wall 1002b of the chassis wall base member 1002 adjacent the IHS component 1202a in the chassis 600, the bottom wall 1002c of the chassis wall base member 1002 adjacent the bottom wall 602b of the chassis 1100, and the chassis vent structure 1004 adjacent the chassis vent structure channel 1102, as illustrated in FIG. 12c. The chassis wall base member 1002 is then moved in a direction C such that the chassis coupling features 1012 on the chassis wall base member 1002 engage respective chassis wall coupling features 606 defined by the chassis 1100, coupling the chassis wall base member 1002 to the chassis 1100, as illustrated in FIG. 12d. The method 1200 then proceeds to step 1206, where air is vented out of the chassis 1100. The fan 608 may be operated to move air from the IHS housing 604 through the chassis vent structure 1004 and out of the chassis 1100. The method 1200 may then proceed to step 1208 where the chassis 1100 is lifted. The lower front wall 1002a of the chassis wall base member 1002 may be used as a handle and grasped through the chassis venting passageway 1006 and, due to the coupling of the chassis wall base member 1002 to the chassis 1100, when the chassis wall base member 1002 is lifted, the chassis 1100 is lifted along with it. Thus, a means is provided for venting the chassis 1100 through the front of the system while obscuring the venting means from sight, while also providing a handle for lifting and transporting the chassis 1100.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A venting system, comprising:
   a chassis defining a housing entrance between a plurality of walls; and
   a chassis venting apparatus coupled to the chassis and located immediately adjacent the housing entrance, the chassis venting apparatus comprising:
   a first wall;
   a chassis vent structure extending from the first wall and towards the chassis, wherein the chassis vent structure defines at least one housing passageway; and
   a chassis venting passageway defined between the chassis vent structure and the first wall, wherein the at least one housing passageway provides an air passageway between the chassis venting passageway and the housing entrance.

2. The system of claim 1, wherein the first wall comprises a solid wall portion positioned adjacent the chassis venting passageway and the chassis vent structure.

3. The system of claim 1, further comprising:
   a chassis coupling feature on the chassis venting apparatus and coupling the chassis venting apparatus to the chassis.

4. The system of claim 1, wherein the at least one housing passageway comprises a venting channel.

5. The system of claim 1 further comprising:
at least one electromagnetic interference gasket coupled to the chassis venting apparatus.

6. The system of claim 1, wherein the chassis venting passageway extends through the chassis venting apparatus.

7. The system of claim 1, wherein the coupling of the chassis venting apparatus and the chassis are such that the first wall may be grasped through the chassis venting passageway and lifted in order to lift the chassis.

8. The system of claim 1, further comprising:
a component access passageway defined by the chassis venting apparatus and located adjacent the chassis vent structure.

9. An information handling system, comprising:
a chassis defining a chassis enclosure and an enclosure entrance that provides access to the chassis enclosure;
a processor coupled to the chassis and located in the chassis enclosure; and
a chassis venting apparatus coupled to the chassis and located immediately adjacent the enclosure entrance, the chassis venting apparatus comprising:
a first wall;
a chassis vent structure extending from the first wall and towards the chassis, wherein the chassis vent structure defines at least one enclosure passageway; and
a chassis venting passageway defined between the chassis vent structure and the first wall, wherein the at least one enclosure passageway provides an air passageway between the chassis venting passageway and the chassis enclosure.

10. The system of claim 9, wherein the first wall comprises a solid wall portion positioned adjacent the chassis venting passageway and the chassis vent structure.

11. The system of claim 9, further comprising:
a chassis coupling feature coupling the chassis venting apparatus to the chassis.

12. The system of claim 9, wherein the at least one housing passageway comprises a venting channel.

13. The system of claim 9, further comprising:
at least one electromagnetic interference gasket located adjacent the chassis wall venting apparatus and the chassis.

14. The system of claim 9, wherein the chassis venting passageway extends through the chassis venting apparatus.

15. The system of claim 9, wherein the coupling of the chassis venting apparatus and the chassis are such that the first wall may be grasped through the chassis venting passageway and lifted in order to lift the chassis.

16. The system of claim 9, further comprising:
a component access passageway defined by the chassis venting apparatus and located adjacent the chassis vent structure, whereby a component located in the chassis enclosure is accessible through the component access passageway.

17. The system of claim 9, further comprising:
a fan coupled to the chassis and located in the chassis enclosure adjacent the chassis vent structure.

18. A chassis venting apparatus comprising:
a chassis defining a chassis enclosure and an enclosure entrance for providing access to the chassis enclosure; and
a chassis venting apparatus coupled to the chassis and located immediately adjacent the enclosure entrance, the chassis venting apparatus comprising:
means for providing a venting passageway in the chassis venting apparatus;
means, extending from the chassis venting apparatus and towards the chassis enclosure, for providing an air passageway between the means for providing a venting passageway and the chassis enclosure; and
means for obscuring the means for providing a venting passageway, wherein the coupling of the chassis venting apparatus and the chassis is such that the means for obscuring may be grasped and lifted in order to lift the chassis.

19. A method for venting a chassis comprising:
providing a chassis defining a chassis enclosure and an enclosure entrance that provides access to the chassis enclosure;
coupling a chassis venting apparatus to the chassis immediately adjacent the enclosure entrance, the chassis venting apparatus comprising a first wall, a chassis vent structure extending from the first wall towards the chassis enclosure and defining at least one enclosure passageway, and a chassis venting passageway defined between the chassis vent structure and the first wall; and
moving air between the chassis enclosure and the chassis venting passageway through the at least one enclosure passageway.

20. The method of claim 19 further comprising:
lifting the chassis by grasping the first wall through the chassis venting passageway.

* * * * *